US011514097B2

(12) United States Patent
Patel et al.

(10) Patent No.: US 11,514,097 B2
(45) Date of Patent: Nov. 29, 2022

(54) SYSTEM AND METHOD FOR UPDATE OF DATA AND META DATA VIA AN ENUMERATOR

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 16/588,631

(22) Filed: Sep. 30, 2019

(65) Prior Publication Data

US 2021/0097099 A1 Apr. 1, 2021

(51) Int. Cl.
*G06F 16/35* (2019.01)
*G06F 16/33* (2019.01)
*G06F 16/383* (2019.01)
*G06F 16/387* (2019.01)

(52) U.S. Cl.
CPC .......... *G06F 16/353* (2019.01); *G06F 16/334* (2019.01); *G06F 16/383* (2019.01); *G06F 16/387* (2019.01)

(58) Field of Classification Search
CPC .... G06F 16/353; G06F 16/334; G06F 16/383; G06F 16/387; G06F 11/1435
See application file for complete search history.

(56) References Cited

U.S. PATENT DOCUMENTS

| 8,417,715 | B1* | 4/2013 | Bruckhaus | G06Q 10/04 705/26.1 |
| 10,296,239 | B1* | 5/2019 | Feldman | G06F 3/0619 |
| 2002/0133491 | A1* | 9/2002 | Sim | H04L 67/1023 |
| 2006/0026219 | A1* | 2/2006 | Orenstein | G06F 11/2097 |
| 2013/0226978 | A1* | 8/2013 | Bestler | G06F 16/22 707/827 |
| 2014/0006951 | A1* | 1/2014 | Hunter | H04N 21/8166 715/719 |
| 2016/0191250 | A1* | 6/2016 | Bestler | G06F 16/2255 713/168 |

(Continued)

OTHER PUBLICATIONS

Ganger et al., "Metadata Update Performance in File System" OSDI '94: Proceedings of the 1st USENIX conference on Operating Systems Design and ImplementationNov. 1994, pp. 5-es (Year: 1994).*

*Primary Examiner* — Mark D Featherstone
*Assistant Examiner* — Kweku William Halm
(74) *Attorney, Agent, or Firm* — Chamberlain, Hrdlicka, White, Williams & Aughtry

(57) ABSTRACT

A data storage system includes storage and a global enumerator. The storage stores data chunks, object level metadata associated with portions of the data chunks, and chunk level metadata associated with respective data chunks. The global enumerator obtains an update request including a metadata characteristic and update data; in response to obtaining the update request: matches the metadata characteristic to at least one selected from a group consisting of a portion of the object level metadata and a portion of the chunk level metadata to identify an implicated metadata portion; and modifies, based on the update data, the implicated metadata portion.

16 Claims, 19 Drawing Sheets

(56) References Cited

U.S. PATENT DOCUMENTS

| | | | |
|---|---|---|---|
| 2016/0191508 A1* | 6/2016 | Bestler | H04L 63/0853 |
| | | | 713/172 |
| 2017/0214701 A1* | 7/2017 | Hasan | H04L 63/145 |
| 2017/0331893 A1* | 11/2017 | Crofton | H04L 67/1097 |
| 2018/0004430 A1* | 1/2018 | Merritt | G06F 11/3466 |
| 2018/0357019 A1* | 12/2018 | Karr | G06F 11/2005 |
| 2020/0250132 A1* | 8/2020 | Ramsden | G06F 16/13 |
| 2020/0311137 A1* | 10/2020 | Gupta | G06F 16/907 |

* cited by examiner

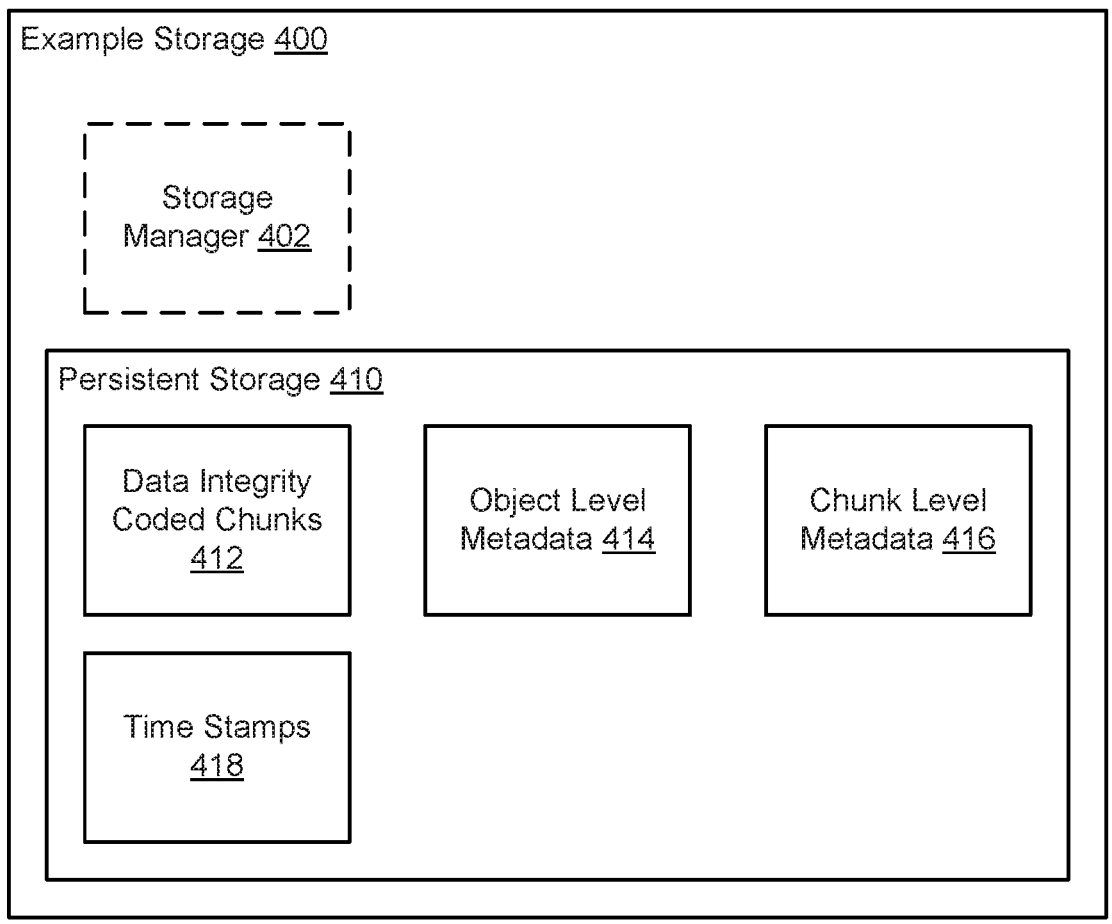
FIG. 4.1
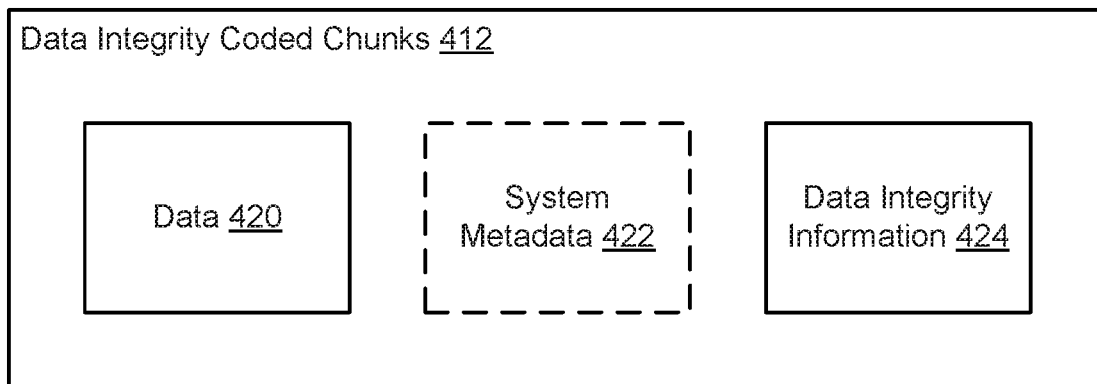
FIG. 4.2

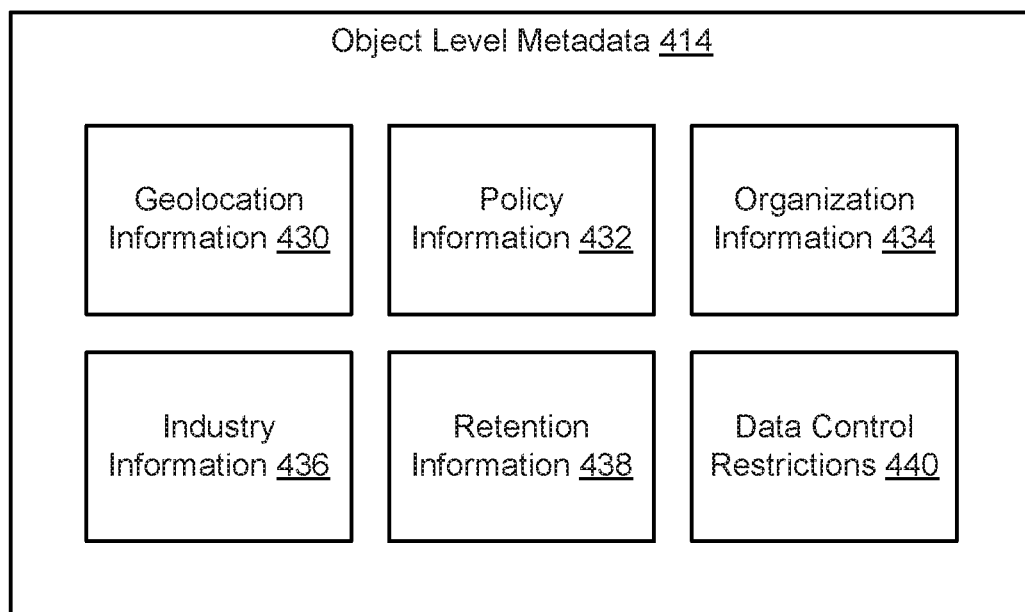
FIG. 4.3

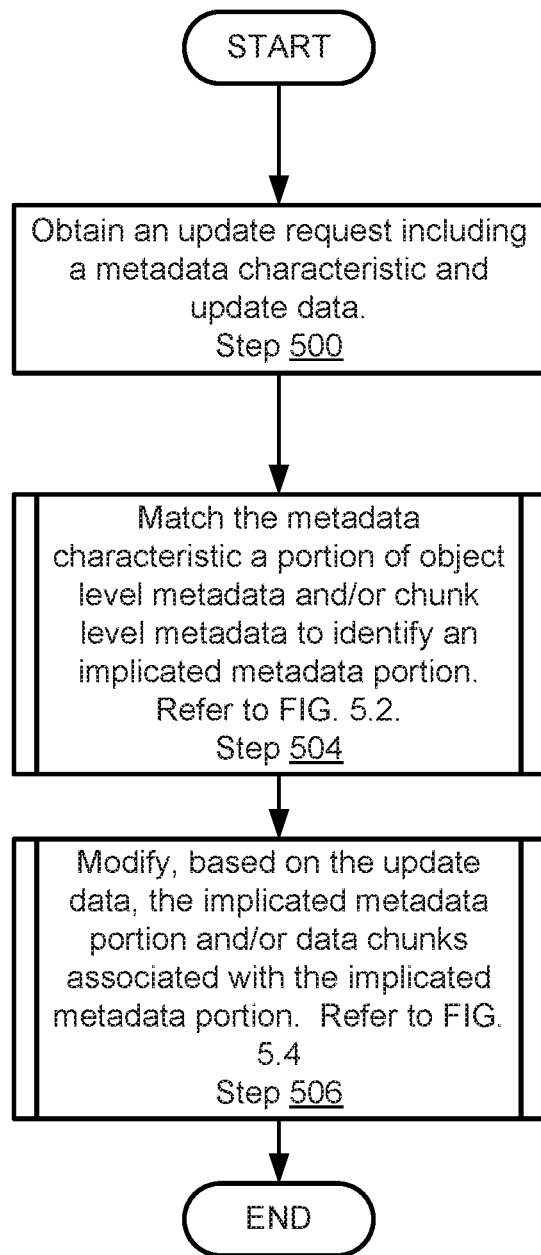
FIG. 5.1

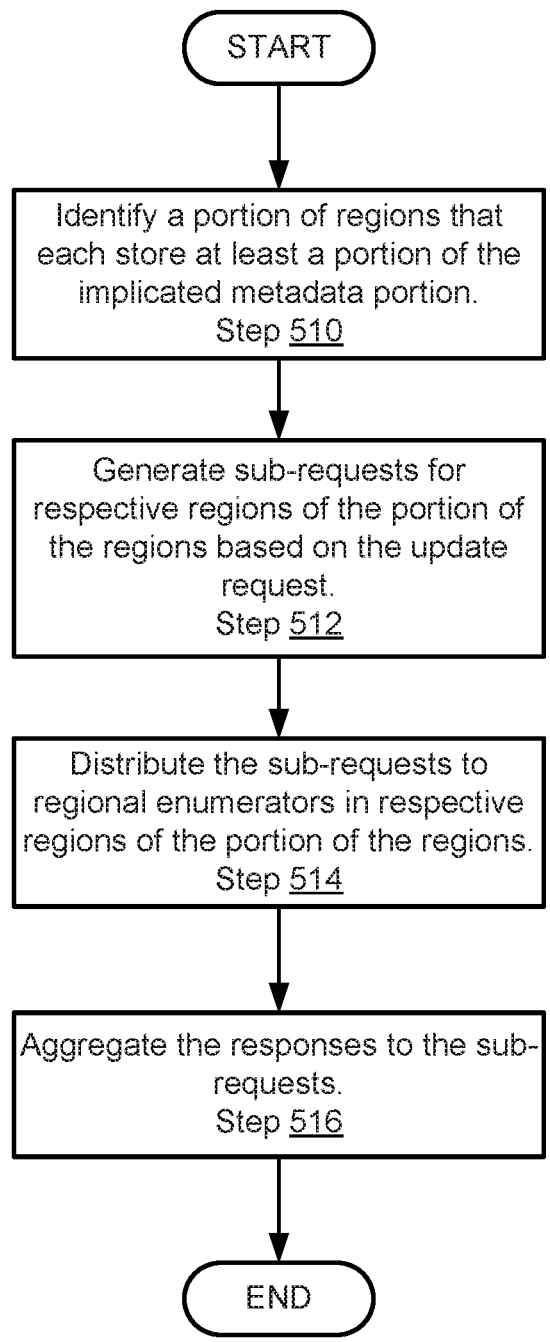
FIG. 5.2

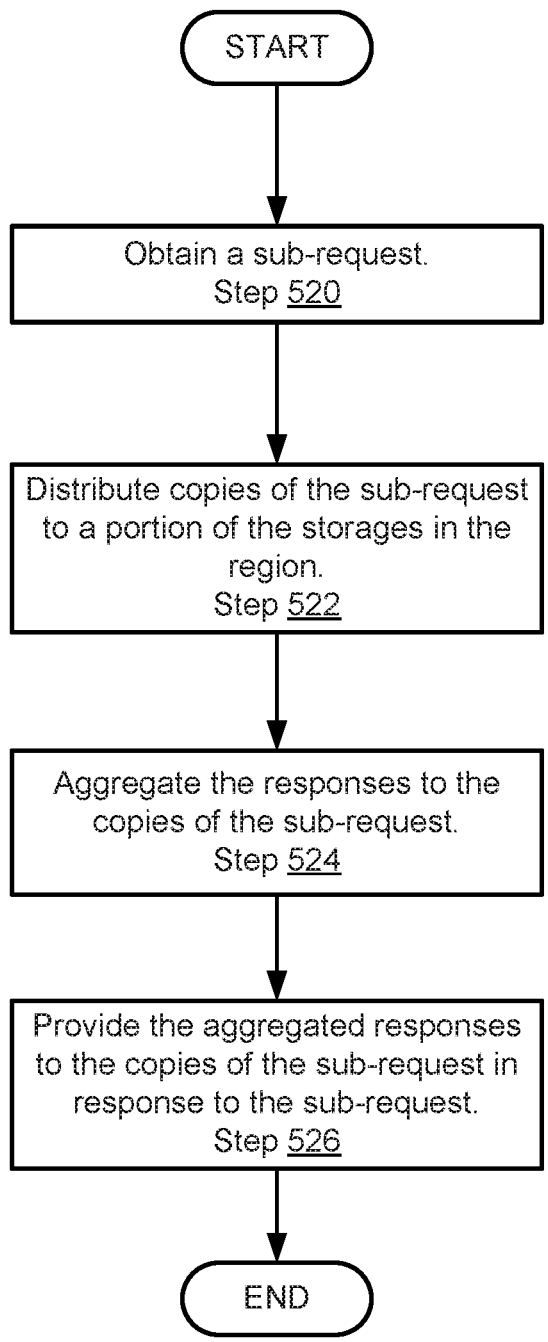
FIG. 5.3

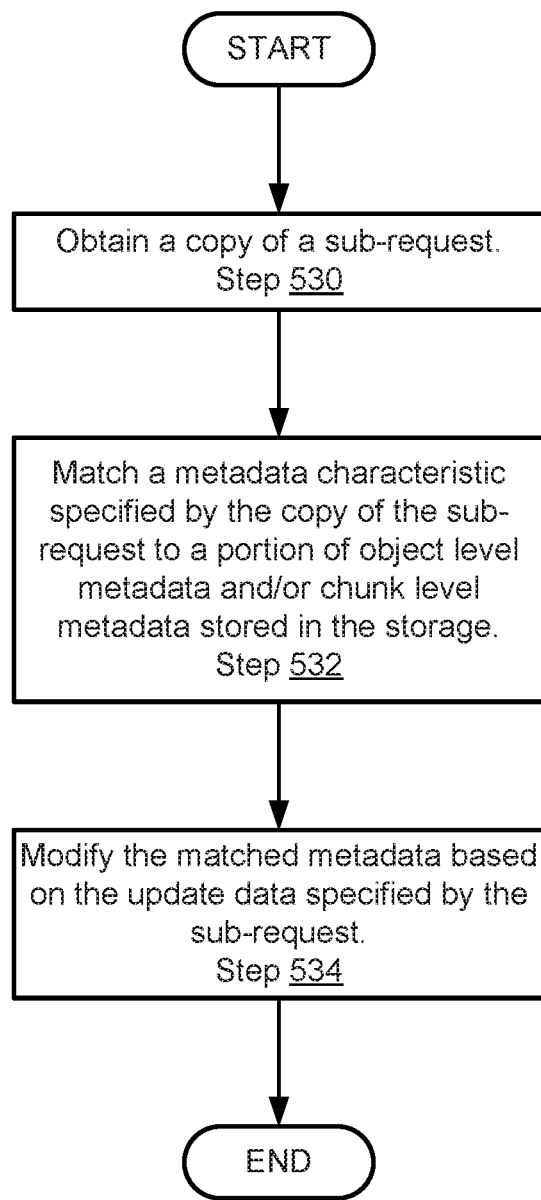
FIG. 5.4

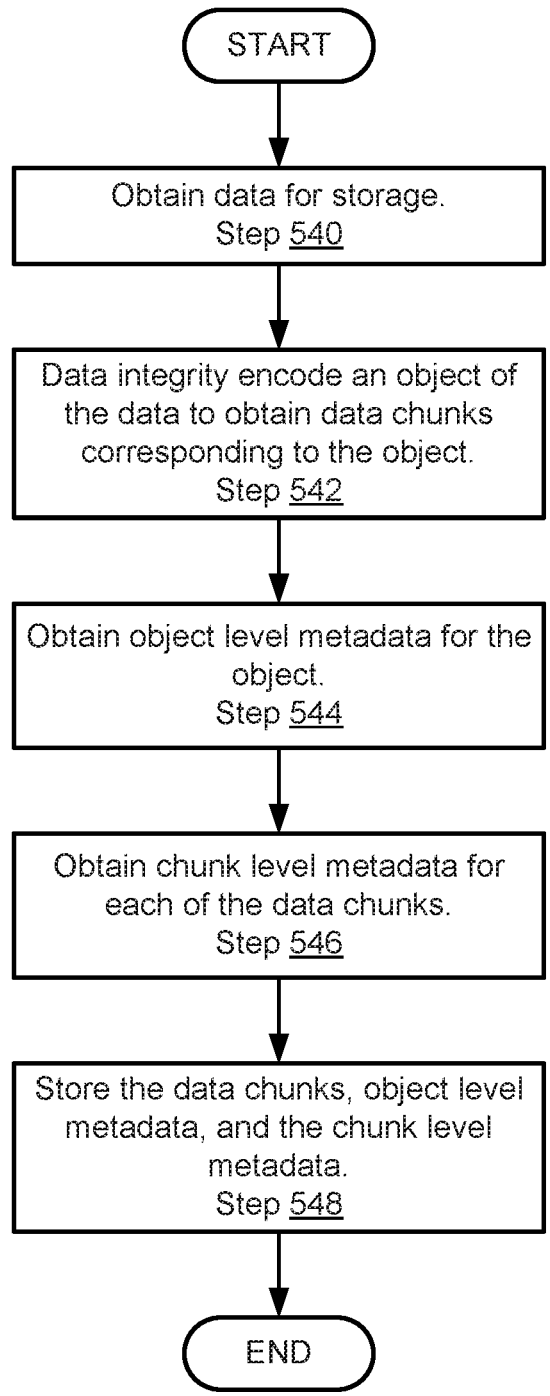
FIG. 5.5

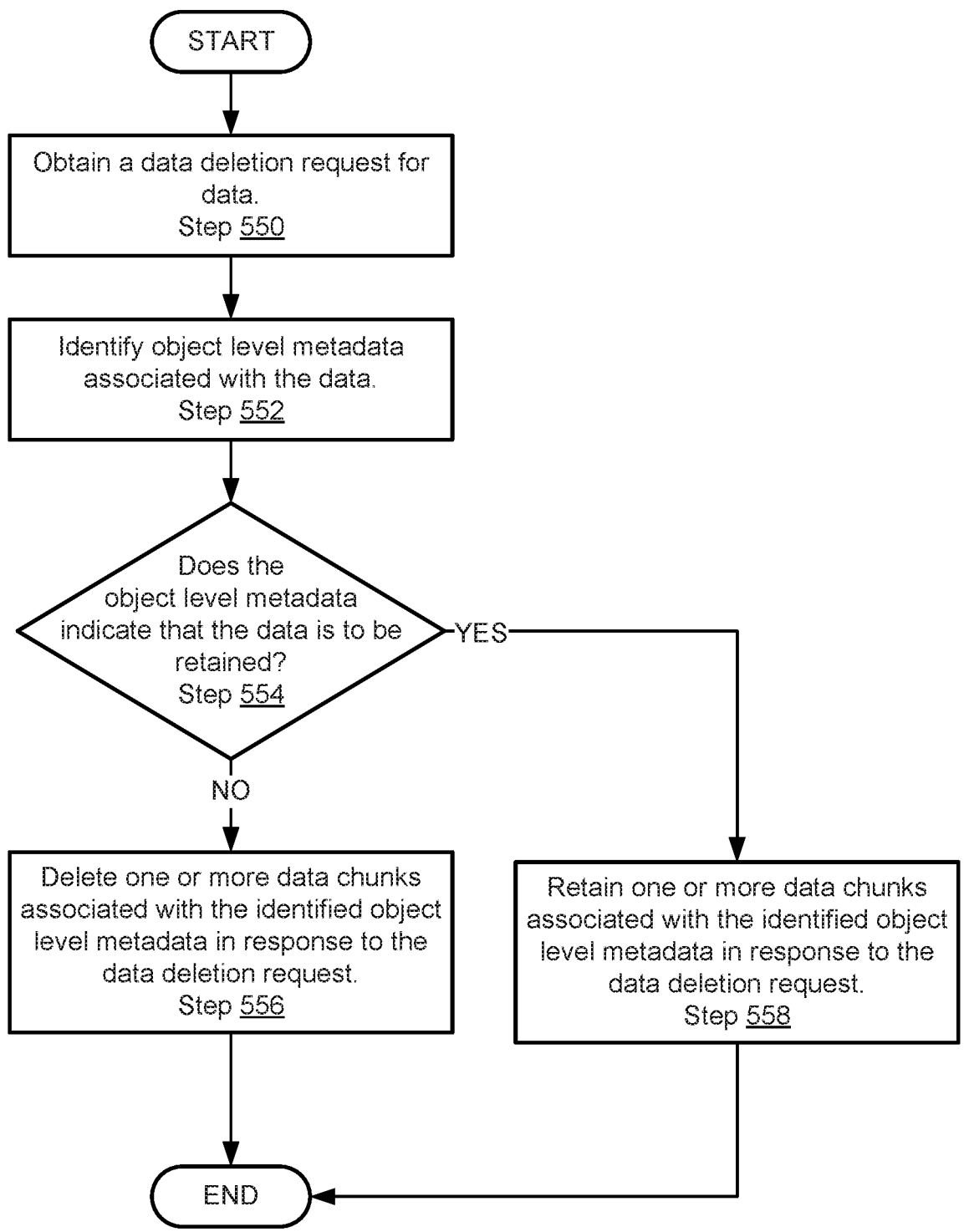
FIG. 5.6

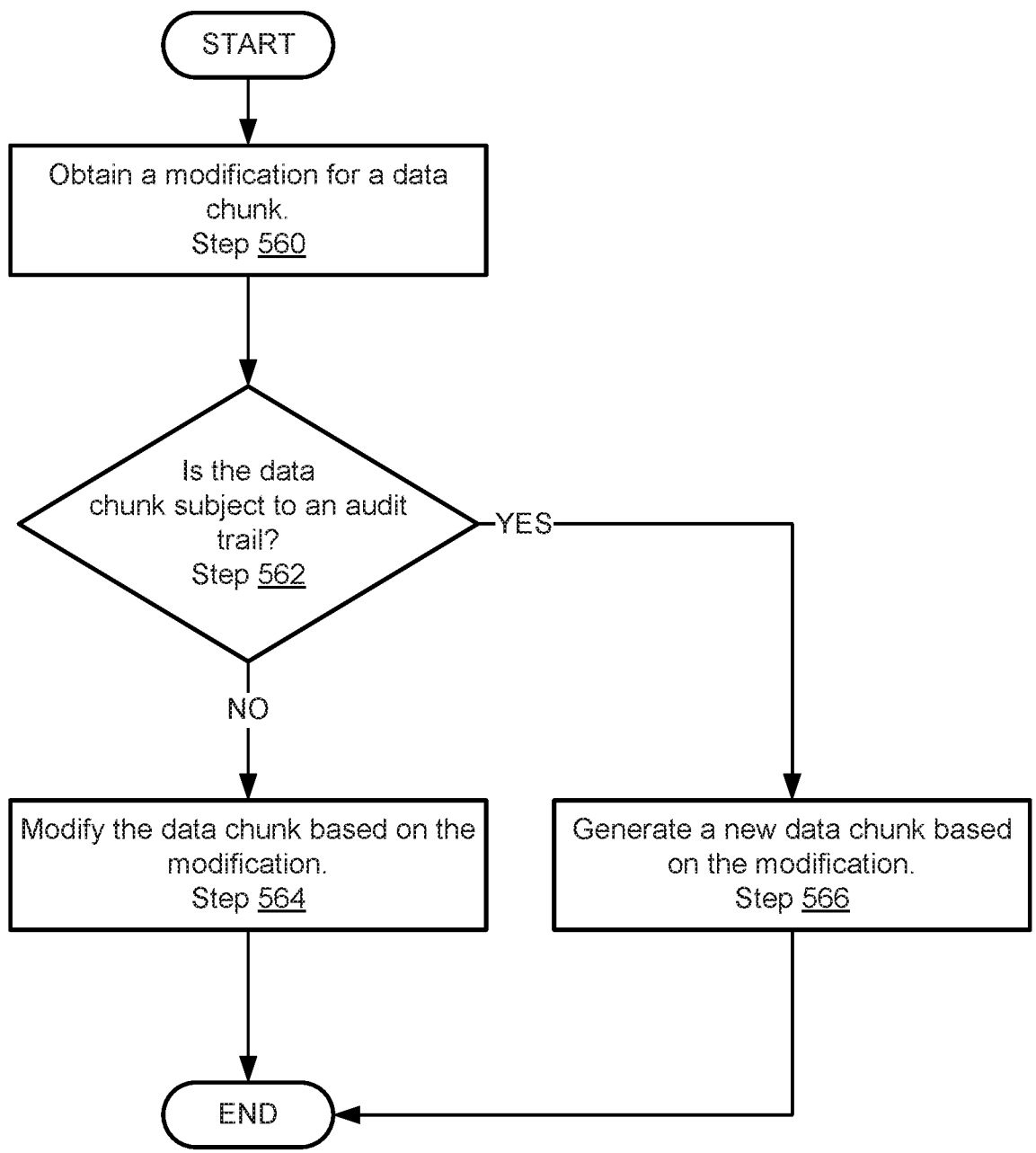
FIG. 5.7

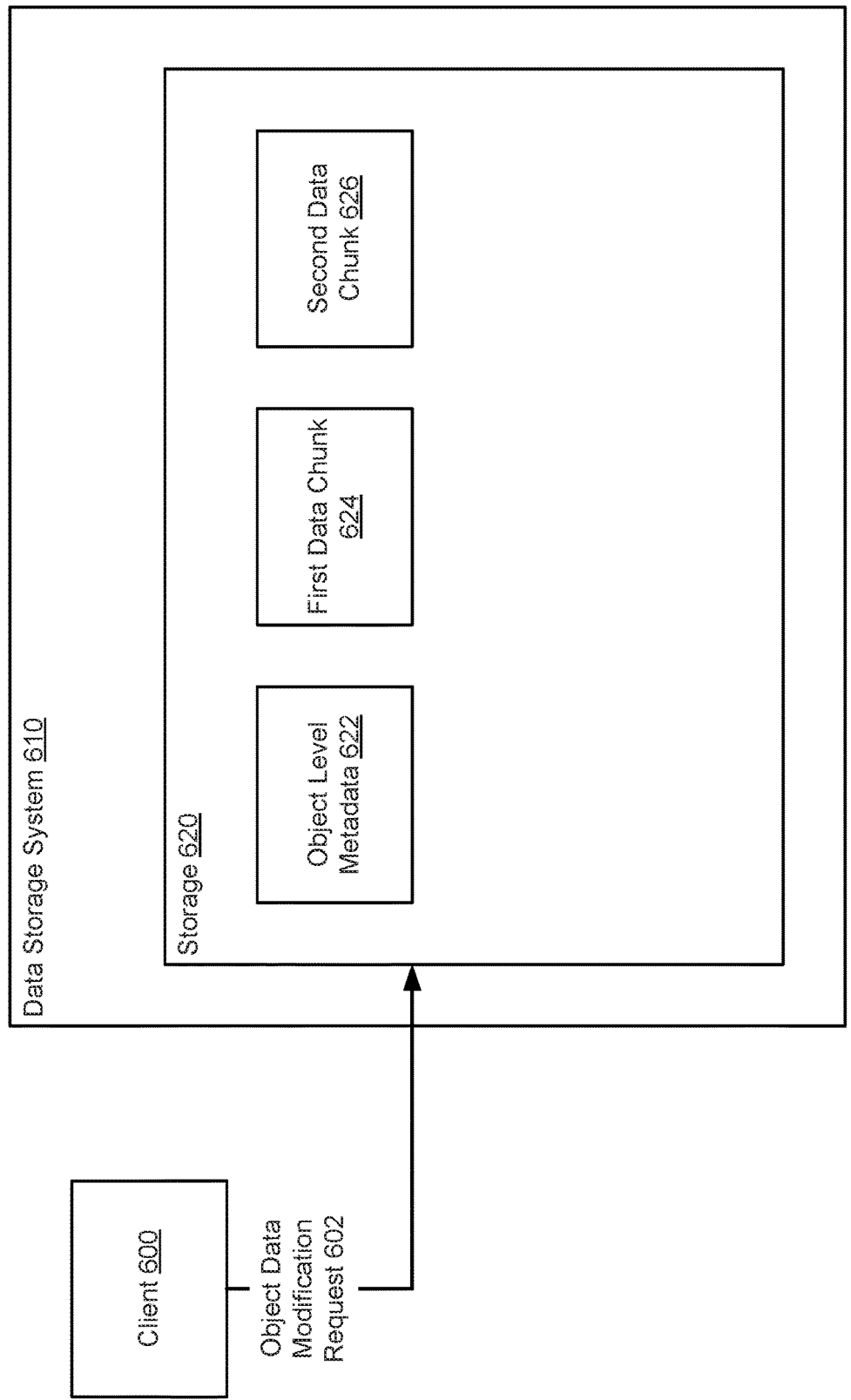
FIG. 6.1

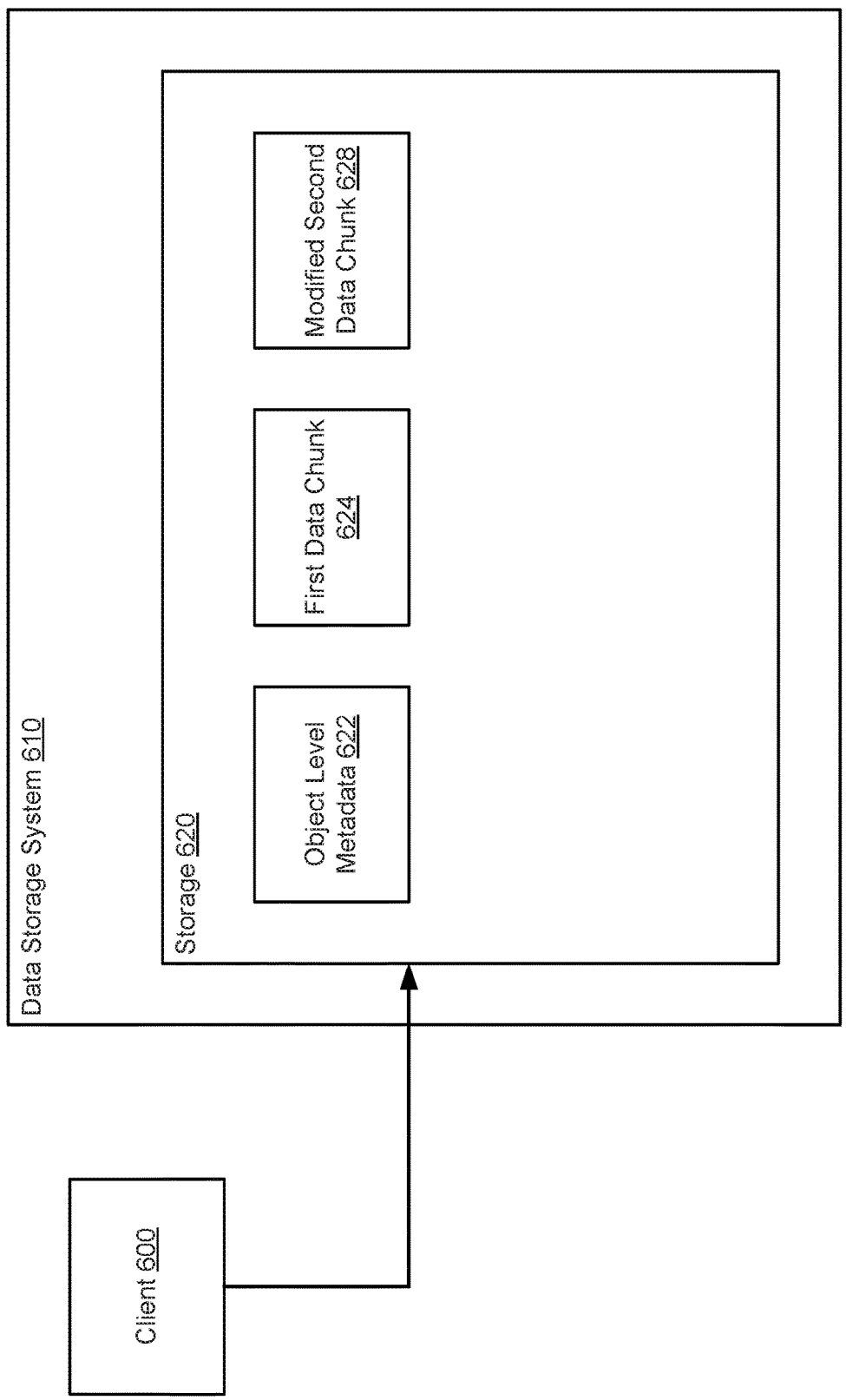
FIG. 6.2

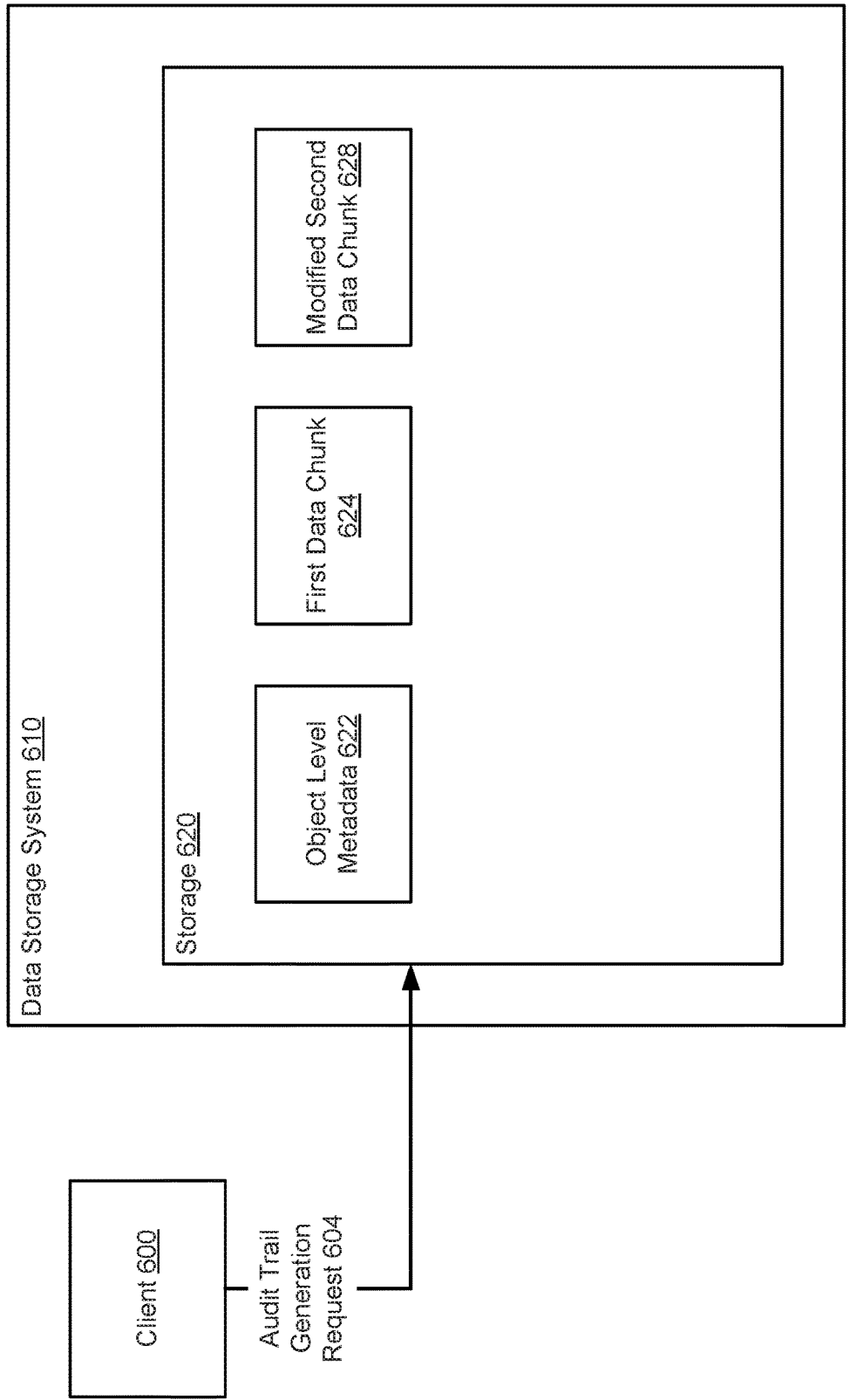
FIG. 6.3

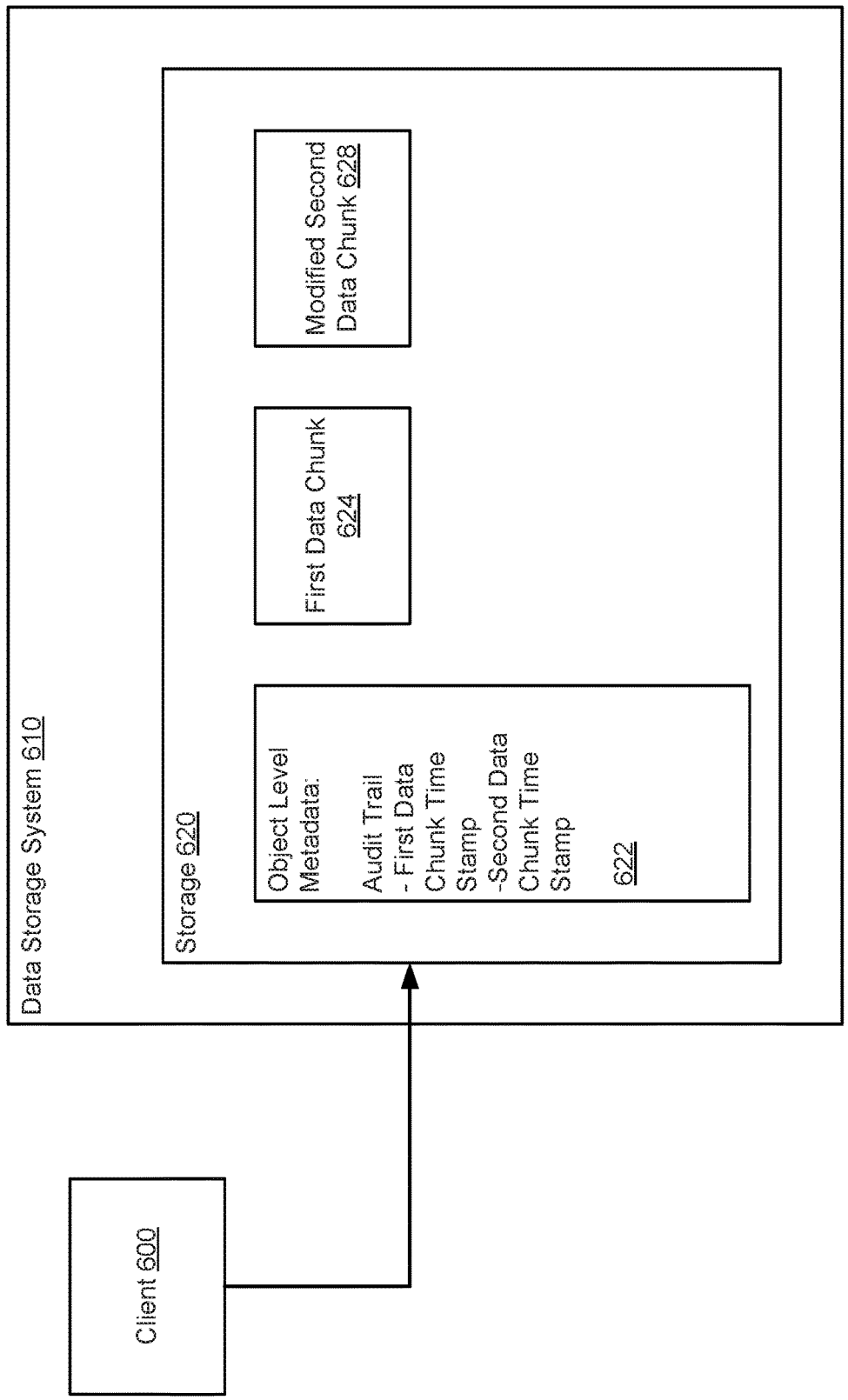
FIG. 6.4

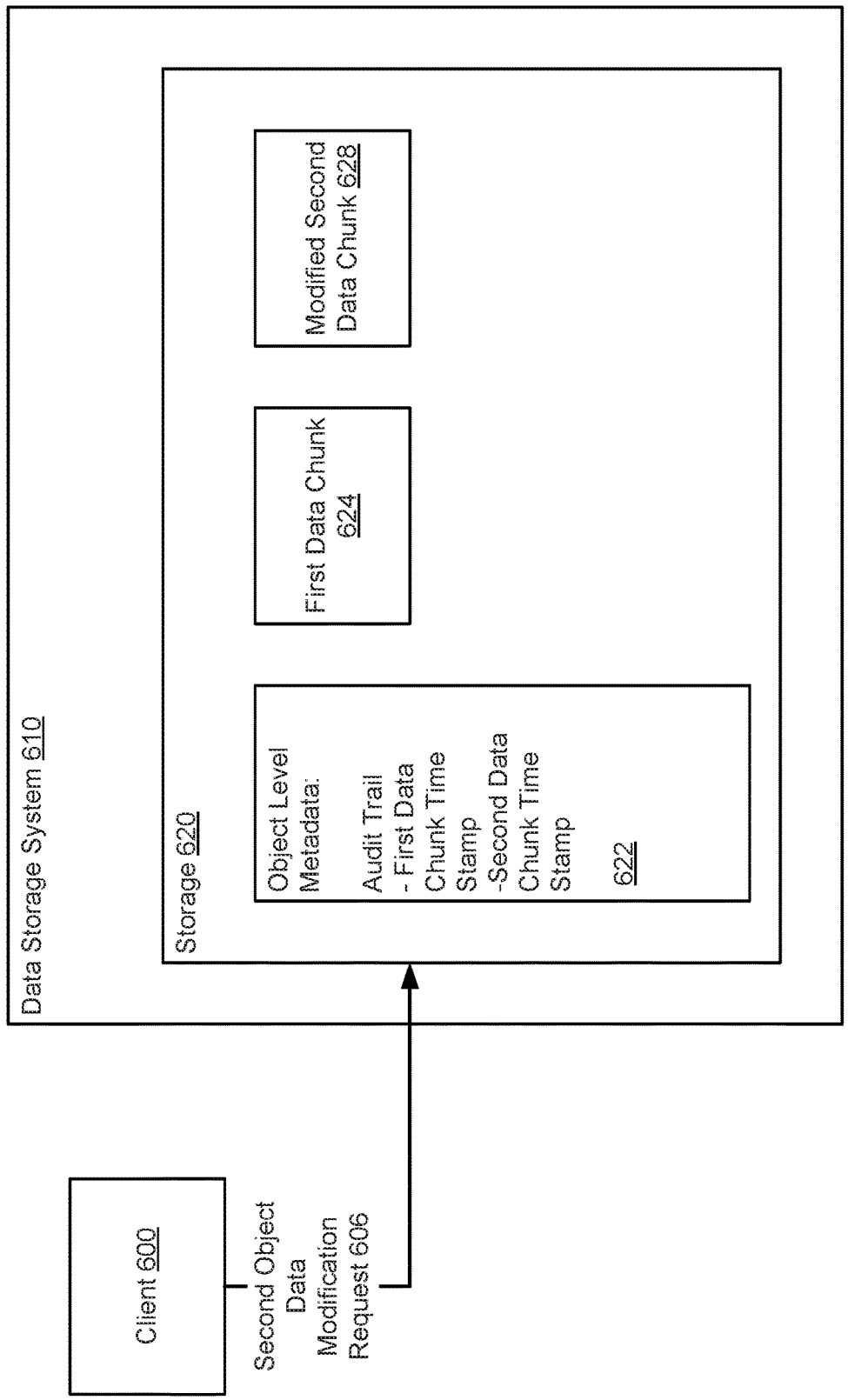
FIG. 6.5

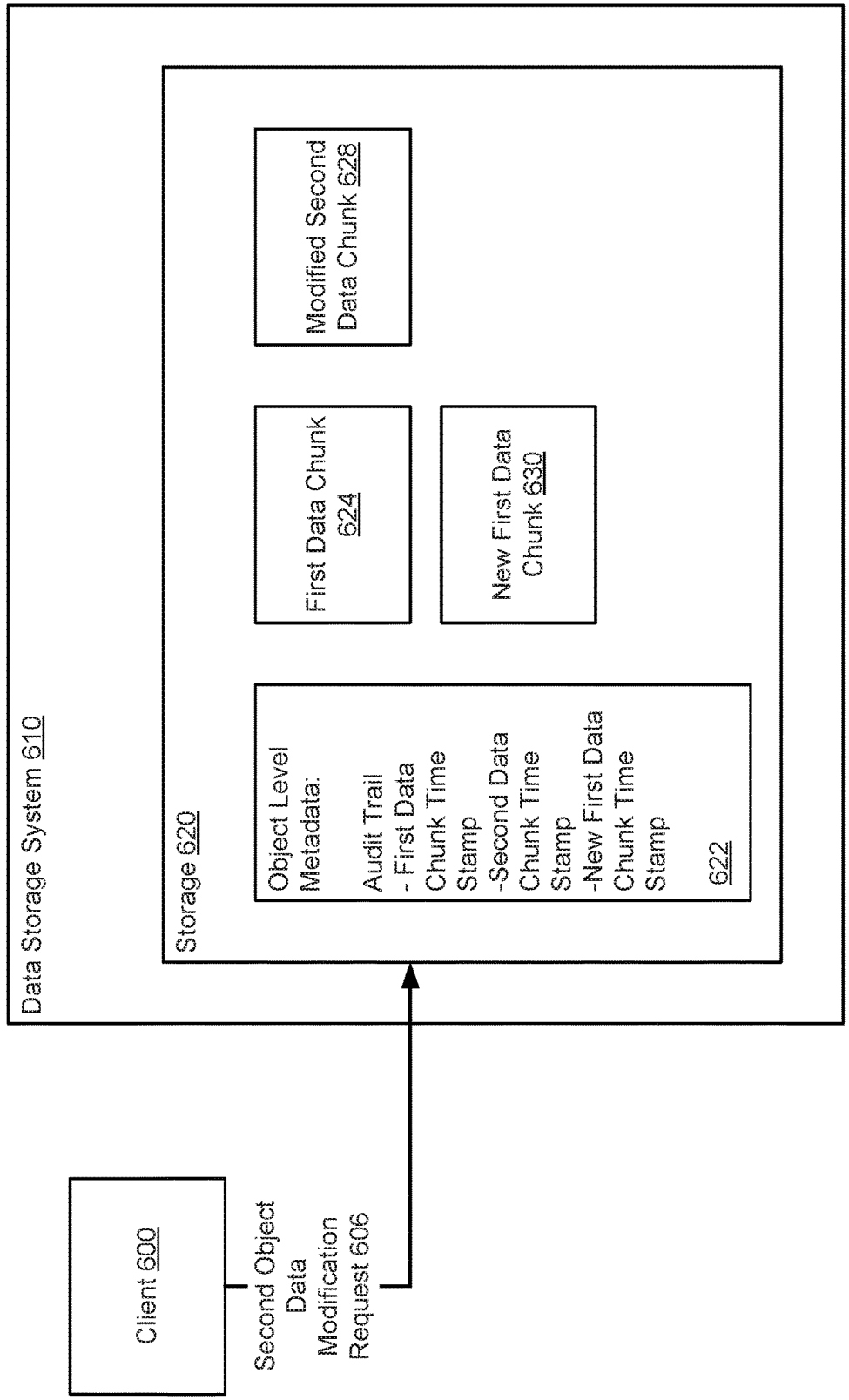
FIG. 6.6

SYSTEM AND METHOD FOR UPDATE OF DATA AND META DATA VIA AN ENUMERATOR

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost, it may be unrecoverable if no copies of the data were made and stored in locations other than the persistent storage. If copies of data are stored in other locations, the data may be separated from an application that utilizes the data. Due to the format of the data, it may be difficult to ascertain the contents of the data without utilizing the application that uses the data.

SUMMARY

In one aspect, a data storage system in accordance with one or more embodiments of the invention includes storage and a global enumerator. The storage stores data chunks, object level metadata associated with portions of the data chunks, and chunk level metadata associated with respective data chunks. The global enumerator obtains an update request including a metadata characteristic and update data; in response to obtaining the update request: matches the metadata characteristic to at least one selected from a group consisting of a portion of the object level metadata and a portion of the chunk level metadata to identify an implicated metadata portion; and modifies, based on the update data, the implicated metadata portion.

In one aspect, a method for managing a data storage system in accordance with one or more embodiments of the invention includes obtaining an update request including a metadata characteristic and update data; in response to obtaining the update request: matching the metadata characteristic to at least one selected from a group consisting of a portion of object level metadata and a portion of chunk level metadata to identify an implicated metadata portion, the object level metadata is associated with portions of data chunks and the chunk level metadata is associated with respective data chunks; and modifying, based on the update data, the implicated metadata portion.

In one aspect, a non-transitory computer readable medium in accordance with one or more embodiments of the invention includes computer readable program code, which when executed by a computer processor enables the computer processor to perform a method for managing a data storage system, the method includes obtaining an update request including a metadata characteristic and update data; in response to obtaining the update request: matching the metadata characteristic to at least one selected from a group consisting of a portion of object level metadata and a portion of chunk level metadata to identify an implicated metadata portion, the object level metadata is associated with portions of data chunks and the chunk level metadata is associated with respective data chunks; and modifying, based on the update data, the implicated metadata portion.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4.1 shows a diagram of an example storage in accordance with one or more embodiments of the invention.

FIG. 4.2 shows a diagram of data integrity coded chunks in accordance with one or more embodiments of the invention.

FIG. 4.3 shows a diagram of object level metadata in accordance with one or more embodiments of the invention.

FIG. 5.1 shows a flowchart of a method of servicing an update request in accordance with one or more embodiments of the invention.

FIG. 5.2 shows a flowchart of a method of matching metadata characteristics in accordance with one or more embodiments of the invention.

FIG. 5.3 shows a flowchart of a method of servicing a sub-request in accordance with one or more embodiments of the invention.

FIG. 5.4 shows a flowchart of a method of servicing a copy of a sub-request in accordance with one or more embodiments of the invention.

FIG. 5.5 shows a flowchart of a method of storing data in accordance with one or more embodiments of the invention.

FIG. 5.6 shows a flowchart of a method of servicing a data deletion request in accordance with one or more embodiments of the invention.

FIG. 5.7 shows a flowchart of a method of servicing a data modification request in accordance with one or more embodiments of the invention.

FIGS. 6.1-6.6 show diagrams of an example system at different point in time.

DETAILED DESCRIPTION

Figure 1:
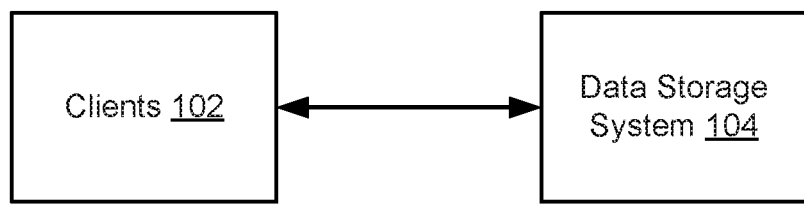
FIG. 1 shows a diagram of a system in time in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems devices and methods for managing data. Specifically, the system may provide methods of updating data and metadata used to manage data in a manner that enables the updates to be efficiently performed without crawling the data. The system may utilize global and regional enumerator services to efficiently identify data and/or metadata that may be relevant to an update request. To do so, the system may store metadata associated with each chunk of the data. The metadata associated with each chunk (i.e., chunk level metadata) of the data may include relevant characteristics of the chunk of the data and/or rules for managing the data chunk that may be desirable to search. Object level metadata may also be stored that is associated with any number of chunks of the data that include data of an object (e.g., a file). The object level metadata may store characteristics of an object that may be desirable to search. The chunk level metadata and object level metadata may enable stored data to be searched for particular characteristics specified by the chunk and object level metadata.

Further embodiments of the invention may provide a system that enables stored data to be efficiently managed. The system may utilize information included in object level metadata and/or chunk level metadata to control the manner in which corresponding data chunks are modified, deleted, and/or created. Additionally, the aforementioned metadata may be used to control which portions of data are subject to audit trail generation requirements. By managing the data using the aforementioned metadata, the data may be managed without restoring to keying the management of the data to characteristics of the data itself, which would otherwise require direct searching of the data. Consequently, the computational cost for managing data in a discriminatory manner (e.g., treating different portions of data different for management purposes) may be reduced.

FIG. 1 shows a diagram of an example system in accordance with one or more embodiments of the invention. The system may facilitate the storage and modification of stored data and/or metadata that may impact the manner in which the stored data may be accessed and/or utilized. The system may include clients (102) and a data storage system (104).

The clients (102) may utilize data management services provided by the data storage system (104). Utilizing the data management services may include storing data in the data storage system (104), obtaining data (or information regarding stored data) stored in the data storage system (104), and/or modifying the manner in which data may be accessed by modifying metadata associated with the data.

For example, the clients (102) may utilize the data storage system (104) to store data. Storing the data in the data storage system (104) may, for example, improve redundancy by storing a replica of data stored in the clients (102) in the data storage system (104), reduce the use of storage resources of the clients (102) by storing data in the data storage system (104) that would otherwise consume the clients' storage resources, or otherwise provide advantages to the clients (102).

The components of the system of FIG. 1 may be operably connected to each other (and/or other components) via any combination of wired and/or wireless networks. Each components of the system of FIG. 1 is discussed below.

The clients (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-5.7. The clients (102) may be implemented using other types of computing devices without departing from the invention. For additional details regarding computing devices, refer to FIG. 7.

The clients (102) may be implemented using logical devices without departing from the invention. For example, the clients (102) may be implemented using virtual machines that utilize computing resources of any number of physical computing devices (e.g., refer to FIG. 7) to provide their respective functionalities. The clients (102) may be implemented using other types of logical devices without departing from the invention.

In one or more embodiments of the invention, the clients (102) provide any number of computer implemented services. The computer implemented services may include, for example, file storage services, database services, electronic communication services, etc. The clients may provide other types of computer implemented services without departing from the invention. Each of the clients (102) may provide similar and/or different computer implemented services.

When providing computer implemented services, the clients (102) may utilize data management services provided by the data storage system (104). Utilizing the data storage services provided by the data storage system (104) may include (i) storing data in the data storage system, (ii) obtaining data stored in the data storage system, and/or (iii) modifying object level metadata and/or chunk level metadata to modify that manner in which data stored by the data storage system may be accessed or modified. As will be discussed in greater detail below, when modifying metadata, the clients (102) may utilize an enumerator service provided by the data storage system (104).

To utilize the enumerator service, the clients (102) may send update requests to the data storage system (104). The update requests may include information that may be used by the data storage system (104) to discriminate a portion of the metadata that is of interest to the clients (102) from the other metadata stored in the data storage system (104).

In one or more embodiments of the invention, the information included in the update requests matches specific types of information used by the enumerator service provided by the data storage system (104) to discriminate metadata stored in the data storage system (104). By including the specific types of information used by the enumerator service, the metadata stored in the data storage system (104) may be discriminated without needing to (i) crawl the data and/or (ii) use system metadata that was used by a file system (or other organizational structure) of another computing device that provided the data to the data storage system (104) for storage purposes to discriminate the portion of the metadata that is relevant to an update request from all of the metadata stored in the data storage system (104).

The system of FIG. 1 may include any number of clients (102) without departing from the invention.

The data storage system (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-5.7. The data storage system (104) may be implemented using other types of computing devices without departing from the invention. For additional details regarding computing devices, refer to FIG. 7.

The data storage system (104) may be implemented using logical devices without departing from the invention. For example, the data storage system (104) may be implemented using virtual machines that utilize computing resources of any number of physical computing devices (e.g., refer to FIG. 7) to provide their respective functionalities. The data storage system (104) may be implemented using other types of logical devices without departing from the invention.

In one or more embodiments of the invention, the data storage system (104) provides data management services. Providing data management services may include (i) storing data, (ii) providing stored data, and/or (iii) enabling metadata (e.g., object level metadata and/or chunk level metadata) stored in the data storage system (104) to be searched and/or modified.

To store data, the data storage system (104) may obtain data, modify the data to improve the likelihood that the data will be accessible in the future, add object level and/or chunk level metadata to the data, and store the modified data, the object level data, and chunk level metadata in storage of the data storage system (104) (and/or in other locations). For example, when the data storage system (104) obtains data for storage, the data storage system (104) may erasure code the data for data integrity purposes and thereby obtain data chunks.

The data storage system (104) may also generate object level metadata that is associated with a portion of the data that includes data of a respective object (e.g., a file used by an organizational system to organize data). The data storage system (104) may further generate chunk level metadata associated with each of the respective chunks. The object level metadata and/or the chunk level the data may include information that enables, for example, the data chunks associated with an object to be retrieved from storage, different portions of the chunks to be discriminated from one another (e.g., enable a level of search functionality), and/or enable different data chunks to otherwise be treated differently for any number of purposes.

For example, the object level metadata and/or the chunk level metadata may include (i) an object identifier that identifies an object associated with one or more data chunks, (ii) a identifier of a storage location of a data chunk, (iii) an identifier of a geographic region in which a data chunk is stored, (iv) an identifier of a data integrity scheme (e.g., erasure coding) used to generate the data chunk or how to use the data chunk based on an applied data integrity scheme, (v) an indicator of whether the data chunk has been deduplicated and/or the number of copies of data that the data chunk represents for deduplication purposes, (vi) an identifier of a region in which the data chunk is stored, (vii) an identifier of a computing resource aggregation in which the data chunk is stored, (viii) an identifier of a data chunk that may be used to retrieve the data chunk, (ix) a classification identifier that specifies a type of data included in a data chunk, and/or (x) an identifier of an organization that has rights (e.g., an owner) in a data chunk. The object level metadata and/or the chunk level metadata may include additional, different, and/or less information without departing from the invention.

To provide the stored data, the data storage system (104) may obtain any number of data chunks corresponding to desired data, reconstitute the desired data using the data chunks, and provide the desired data. For example, data having a particular characteristic may be desirable to an entity. To provide the data, the data storage system (104) may search the object level metadata and/or the chunk level metadata to determine whether the corresponding data chunks have characteristics matching the particular characteristics desired by the entity. Any data chunks matching the aforementioned characteristics may be obtained and used to provide the desired data.

To enable metadata stored in the data storage system (104) to be searched and/or modified, the data storage system (104) may generate object level metadata and/or chunk level metadata in a predetermined manner (e.g., having a predetermined format that includes predetermined types of information). Any number of copies of the metadata may be stored in any number of locations to facilitate searching of the aggregate and/or discrete portions of the metadata. Consequently, object level metadata and/or chunk level metadata may be searched in a computationally and/or time efficient. For additional details regarding the data storage system (104), refer to FIGS. 2-4.3.

While the system of FIG. 1 has been illustrated and described as including a limited number of specific components, a system in accordance with one or more embodiments of the invention may include additional, fewer, and/or different components without departing from the invention.

Figure 2:
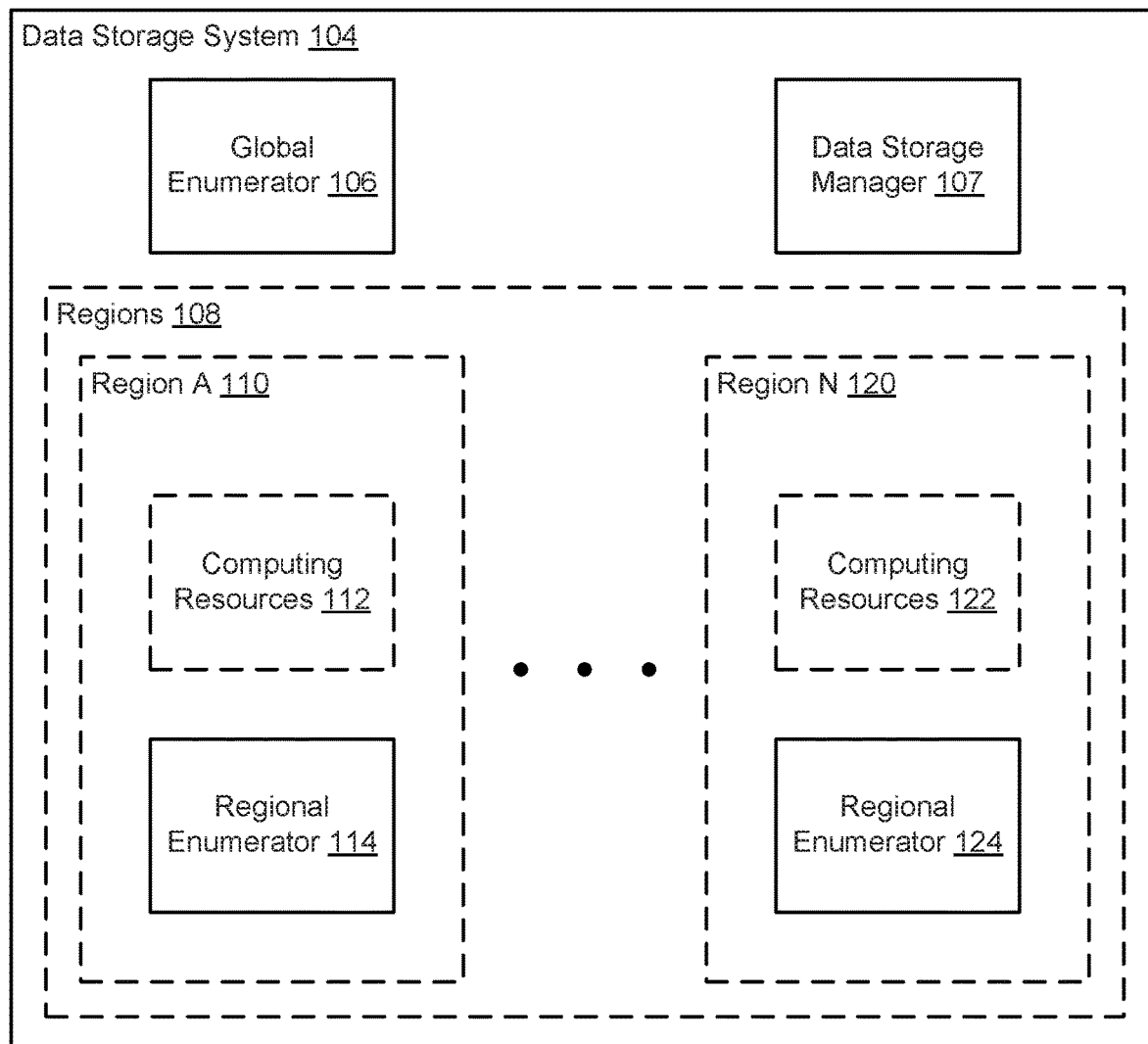
FIG. 2 shows a diagram of a data storage system in accordance with one or more embodiments of the invention.

As discussed above, a data storage system in accordance with one or more embodiments of the invention may provide data management services to any number of clients and/or other entities. FIG. 2 shows a diagram of a data storage system (104) in accordance with one or more embodiments of the invention. As discussed above, the data storage system (104) may provide data management services to clients.

To provide data management services to the clients, the data storage system (104) may include a global enumerator (106), a data storage manager (107), and any number of regions (108). Each of these components of the data storage system (104) is discussed below.

The global enumerator (106) may provide search functionality, data retrieval functionality, and/or metadata (e.g., object level metadata and/or chunk level metadata) modification functionality for data and/or metadata stored in the data storage system (104). For example, the global enumerator (106) may receive update requests for modifications of metadata and service the aforementioned request. The update request may be, for example, a request to modify metadata data having a particular characteristic(s) to have additional and/or different characteristics. By modifying the metadata, the manner in which the data stored in the data storage system may be searched, modified, accessed, etc.

To service the data access requests, the global enumerator (106) may include functionality to search object level metadata and/or chunk level metadata associated with data stored in the data storage system (104). To search the aforementioned metadata, the global enumerator (106) may include functionality to generate sub-requests based on an update request. The sub-request may be a request that has been customized for a particular region of the regions (108). The global enumerator (106) may generate any number of such sub-requests when servicing an update request.

For example, an update request obtained by the global enumerator (106) may only implicate metadata stored in a subset of the regions (108). To service the aforementioned update request, the global enumerator (106) may only generate sub-requests for each of the implicated regions. Once generated, the global enumerator (106) may send the aforementioned sub-requests to the corresponding regions. By doing so, only regions implicated by update requests may receive sub-requests. Consequently, the total computing resources consumed for servicing an update request may be reduced when compared to servicing an update request by generating and sending sub-requests to all of the regions, even those that are unlikely to include metadata responsive to the update request.

To generate such sub-requests, the global enumerator (106) may maintain a cache (not shown) or other type of data structure that includes a portion of the object level metadata and/or chunk level metadata maintained by the regions. For example, the global enumerator (106) may maintain a cache of the object level metadata included in each of the regions (108). By doing so, the global enumerator (106) may utilize the data included in the cache to determine which of the regions is likely to include metadata that is responsive to an update request. By doing so, the global enumerator (106) may generate a customized set of sub-requests for each data access request (e.g., by identifying a subset of the regions based on copies of metadata included in the cache).

Once the sub-requests are generated, the global enumerator (106) may send the sub-requests to corresponding regions. More specifically, the sub-requests may be sent to regional enumerators in each of the regions. In turn, the regional enumerators may process the obtained sub-requests to modifying corresponding metadata in the region.

The global enumerator (106) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the global enumerator (106) described in this application and/or all, or a portion, of the methods illustrated in FIGS. 5.1-5.7. The global enumerator (106) may be implemented using other types of computing devices without departing from the invention. For additional details regarding computing devices, refer to FIG. 7.

The global enumerator (106) may be implemented using logical devices without departing from the invention. For example, the global enumerator (106) may be implemented using virtual machines that utilize computing resources of any number of physical computing devices (e.g., refer to FIG. 7) to provide their respective functionalities. The global enumerator (106) may be implemented using other types of logical devices without departing from the invention.

The data storage manager (107) may provide data storage functionality. For example, the data storage manager (107) may obtain data for storage, encode the data for data reliability purposes (e.g., erasure code), generate object level and/or chunk level metadata, and store the data and/or the aforementioned metadata. When storing coded data, the data storage manager (107) may store the data across multiple fault domains in accordance with a data integrity scheme (e.g., erasure coding). The data storage manager (107) may also store the object level metadata and/or chunk level metadata in a searchable repository. By doing so, the regional enumerators (e.g., 114, 124) may service sub-requests by searching the aforementioned metadata rather than the data chunks.

The data storage manager (107) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the data storage manager (107) described in this application and/or all, or a portion, of the methods illustrated in FIGS. 5.1-5.7. The data storage manager (107) may be implemented using other types of computing devices without departing from the invention. For additional details regarding computing devices, refer to FIG. 7.

The data storage manager (107) may be implemented using logical devices without departing from the invention. For example, the data storage manager (107) may be implemented using virtual machines that utilize computing resources of any number of physical computing devices (e.g., refer to FIG. 7) to provide their respective functionalities. The data storage manager (107) may be implemented using other types of logical devices without departing from the invention.

While the global enumerator (106) and the data storage manager (107) are illustrated as entities separate from the regions (108), the regions (108) may provide the functionality of the global enumerator (106) and the data storage manager (107) without departing from the invention. For example, the regional enumerator in each of the regions may provide the functionality of the global enumerator (106) when a particular region (e.g., 110, 120) obtains an update request (or other type of request that implicates distributed action by the data storage system (104)). The aforementioned regional enumerator may provide the functionality of the global enumerator (106) in addition to its own functionality of the regional enumerator, which will be discussed in greater detail below. Similarly, each of the regions (108) may separately host respective instances of the data storage manager (107).

The regions (108) may be logical groupings of computing resources. The data storage system (104) may include any number of regions. The computing resources of each region may include any number of physical and/or logical computing devices. For details regarding a physical computing device, refer to FIG. 7. The computing resources (e.g., 112, 122) of each of the regions (e.g., 110, 120) may host a regional enumerator (e.g., 114, 124) and may provide data management services. The data management services provided by the computing resources (e.g., 112, 122) of each region may include storing of data, storing of metadata, and modification of stored data and/or metadata. For additional details regarding computing resources, refer to FIG. 3.

As discussed above, the regional enumerators may service sub-requests obtained from the global enumerator (106). To service sub-requests, the regional enumerators (e.g., 114, 124) may obtain the requests, use object level metadata and/or chunk level metadata to identify any number (e.g., none, one, many) of portions of the metadata that are responsive to the requests, and take action to complete the requests. For example, the actions may include modifying all, or a portion, of the object level metadata and/or chunk level metadata that is responsive to the requests.

The regional enumerators may be implemented using physical and/or logical devices. For example, the regional enumerators may be implemented using computer readable instructions (e.g., program code) that when executed by the computing resources of a region give rise to the functionality of the regional enumerator. In another example, the regional enumerators may be implemented using special purpose hardware devices such as, for example, programmable gate arrays, application specific integrated circuit, or other type of hardware device that provides the functionality of the regional enumerators by including circuitry adapted to provide the aforementioned functionality. In a still further example, the regional enumerators may be implemented using a combination of computer readable instructions (e.g., program code) and special purpose hardware devices that cooperatively provide the functionality of the regional enumerators.

In some embodiments of the invention, the different regions of the regions (108) may correspond to logical groupings of computing resources that are disposed in different geographic regions. The geographic regions may, for example, correspond to different countries that place different data control restrictions on the storage and/or transmission of different types of data. Consequently, the computing resources disposed in each of the different regions (e.g., 110, 120) may be subject to different data control restrictions. Data control restrictions may be, for example, limits on how data may be modified, transferred, or otherwise utilized. For example, personal information may be regulated in Europe under the general data protection regulation which provides for civil penalties regarding specific uses of personal information.

For example, consider a scenario in which the computing resources (112) of region A (110) may be disposed in the United States while the computing resources (122) of region N (120) may be disposed in Europe. Each of these geographic regions has different data control restrictions imposed by the local governments. Consequently, the governmental regulations that apply to data stored in the computing resources (112) of region A (110) may be different from those that apply to the data stored in the computing resources (122) of region N (120).

While the data storage system (104) has been described and illustrated as including a limited number of specific components, a data storage system (104) in accordance with embodiments of the invention may include additional, fewer, and/or different components.

Figure 3:
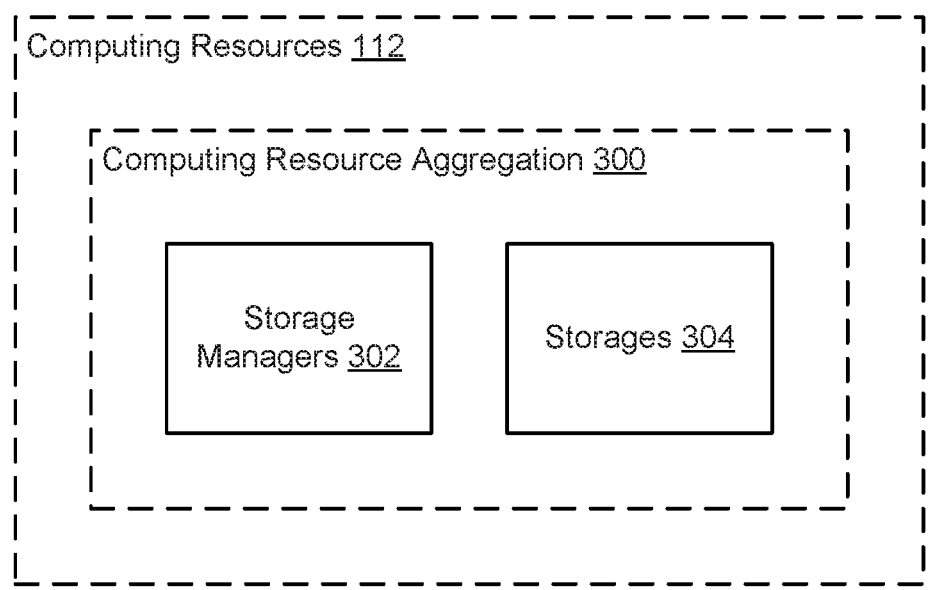
FIG. 3 shows a diagram of computing resources in accordance with one or more embodiments of the invention.

As discussed above, a region (e.g., 110, 120) may be a logical grouping of computing resources. The grouping may correspond to a geographic and/or regulatory boundary (e.g., all of the computing resources of a region may be subject to the same data control restrictions). FIG. 3 shows a diagram of computing resources (112) in accordance with one or more embodiments of the invention.

The computing resources (112) of a region may include any number of computing resource aggregations (e.g., 300) as illustrated in FIG. 3. A computing resource aggregation (300) in accordance with one or more embodiments of the invention may include any quantity of physical and/or logical computing resources.

For example, a computing resource aggregation (300) may be implemented as a computing cluster, a cloud resource (e.g., a logical entity that utilizes any quantity of computing resources of any number of physical computing devices), a hyperconverged architecture, a server farm, or any other type of grouping of computing resources. The physical and/or logical computing resources of the computing resource aggregation (300) may be adapted to provide the functionality of the computing resource aggregation (300). To be adapted to provide the functionality of the computing resource aggregation (300), the physical computing resources of the computing resource aggregation (300) may execute computer instructions (e.g., computer code) that cause processing devices of the computing resource aggregation (300) to provide all, or a portion, of the functionality of the computing resource aggregation (300), the physical computing resources may include dedicated circuitry that provides all, or a portion, of the functionality of the computing resource aggregation (300), and/or include/host other types of physical and/or logical entities that provide the functionality of the computing resource aggregation (300).

The computing resource aggregation (300) may provide data storage services. The data storage may include storing data, metadata, and providing copies of stored data and metadata. To provide the functionality of the computing resource aggregation (300), the computing resource aggregation (300) may include one or more storage manager (302) and one or more storages (304). Each of the aforementioned components of the computing resources aggregation (300) is discussed below.

The storage managers (302) may manage storing of data in storage resources of the computing resource aggregation (300) and providing copies of data stored in the storage resources. For example, the storage managers (302) may store data in the storages (304) and provide data stored in the storages (304) in response to requests from regional enumerators and/or other entities.

To do so, the storage managers (302) may include functionality to generate data chunks, object level metadata, and chunk level metadata, as discussed above. To generate the data chunks, the storage managers (302) include functionality to encode data for data integrity purposes. For example, the storage managers (302) may include functionality to generate erasure coded data that includes any number of data and parity chunks.

The storage managers (302) may include functionality to implement any number of erasure coding algorithms. The erasure coding algorithms implemented by the storage managers (302) may generate erasure coded data (e.g., data integrity coded chunks) corresponding to any erasure coding scheme (e.g., 3:1, 4:2, etc.). The storage managers (302) may include functionality to store the aforementioned data chunks across any number of fault domains for data integrity purposes.

Additionally, the storage managers (302) may include functionality to regenerate data in accordance with any number of erasure coding schemes (or other type of data integrity schemes). For example, the storage managers (302) may be capable of responding to failures of one or more of the storages (304) by regenerating any portion of the data stored in the failed on or more of the storages (304) in accordance with data integrity schemes employed by the storage managers (302).

For example, consider a scenario in which data chunks are erasure coded in a 3:1 manner and stored across four of the storages (304). In response to a failure of one of the four storages, the storage managers (302) may regenerate the data using the remaining data. Once regenerated, the regenerated data may be stored in another one of the storages (304).

In addition to erasure coding data for data integrity purposes, the storage managers (302) may implement any number of other data integrity algorithms such as, for example, mirroring.

The storage managers (302) may also store any number of copies of object level metadata and/or chunk level metadata. For example, the storage managers (302) may store copies of the aforementioned metadata data in persistent storage (e.g., the storages (304)) and/or memory (i.e., an in-memory data structure).

The storage managers (302) may be implemented using any combination of physical and/or logical devices. For example, the storage managers (302) may be implemented using computer readable instructions (e.g., program code) that when executed by the computing resources of the computing resource aggregation (300) give rise to the functionality of the storage managers (302). In another example, the storage managers (302) may be implemented using special purpose hardware devices such as, for example, programmable gate arrays, application specific integrated circuit, or other type of hardware device that provides the functionality of the storage managers (302) by including circuitry adapted to provide the aforementioned functionality. In a still further example, the storage managers (302) may be implemented using a combination of computer readable instructions (e.g., program code) and special purpose hardware devices.

While the storage managers (302) are illustrated in FIG. 3 as being separate devices from that of the storages (304), the functionality of the storage managers (302) may be performed by the storages (304) without departing from the invention.

The computing resource aggregation (300) may include any number of storage managers (302). For example, the computing resource aggregation (300) may include more storages (304) than storage managers (302) (e.g., a storage manager utilizes the storage resources of multiple storages) or the same number of storage managers (302) as storages (304) (e.g., each storage manager utilizes only the storage resources of a corresponding storage). In some embodiments of the invention, two storages may utilize the storage resources of a single storage (e.g., different portions of the storage resources of the storage are utilized by different storage managers). In some embodiments of the invention, two storages may share a portion of the storage resources of a single storage (e.g., a shared storage resource).

The storages (304) may be implemented using physical and/or logical devices that provide storage resources that may be utilized by the storage managers (302) and/or other entities. For example, the storages (304) may be implemented using physical (e.g., hard disk drives, solid state drives, etc.) and/or logical storages (e.g., virtual disks). By proving storage resources to the storage managers (302), the storage managers (302) may be able to store data using the storage resources and provide copies of stored data using the storage resources.

In one or more embodiments of the invention, all, or a portion, of the storage (304) are implemented as computing accelerated storage device. A computing accelerated storage device may be a storage device that include the ability to execute algorithms (e.g., includes processing/memory resources to execute computer instructions and/or includes a hardware device that includes dedicated circuitry that provides the functionality of the algorithms) to facilitate storing of data in persistent storage of the computing accelerated storage device. For example, a computing accelerated storage device may include processing resources, memory resources, and may store computer instructions that when executing using the processing resources and/or memory resources causes the computing accelerated storage device to perform one or more algorithms. The one or more algorithms may correspond to all, or a portion, of the functionality of the storage managers (302).

Implementing the storages (304) using computing accelerated storage devices may enable the computing resource aggregation (300) to perform distributed algorithms, at the storage level, in a coordinated manner to provide its functionality. Doing so may free the computing resources of devices hosting the storages (304) to perform other types of functionality of the computing resource aggregation (300). For example, a computing device of the computing resource aggregation (300) may include both a processor and a computing accelerated storage. The computing accelerated storage may provide a portion of the functionality of the computing device (i.e., implementing storage algorithms) without utilizing processing resources of the processor or other types of hardware devices of the computing device.

While the computing resources (112) have been described as including a limited number of specific components, the computing resources (112) may include additional, different, and/or fewer components without departing from the invention.

As discussed above, a data storage system in accordance with embodiments of the invention may store data in a format (i.e., a data structure) that enables stored data and metadata to be searched for particular characteristics without resorting to crawling the stored data, which may be computationally expensive. To further clarify aspects of the format of stored data and metadata in accordance with embodiments of the invention, FIGS. 4.1-4.3 show a diagram of an example storage (400) that stores data in a particular format and diagrams of data structures that may be used by the example storage (400), respectively.

FIG. 4.1 shows a diagram of an example storage (400) in accordance with embodiments of the invention. The example storage (400) may be similar to the storages (304) illustrated in FIG. 3. As discussed with respect to the storages (304) of FIG. 3, the example storage (400) may provide all, or a portion, of the functionality of a storage manager (402) corresponding to one of the storage managers illustrated in FIG. 3.

The storage manager (402) may include functionality to perform any number of algorithms related to storing data and metadata in persistent storage (410) of the example storage (400) and providing data and metadata stored in the persistent storage (410). For example, the storage manager (402) may include functionality to store data in an erasure coded format (or other type of data integrity storage format), search/generate object level metadata and/or chunk level metadata, modify an erasure coding format of stored data, store data in other storages (e.g., to meet fault domain or other restrictions related to data integrity schemes employed for data storage purposes), and/or other functionalities.

In one or more embodiments of the invention, the storage manager (402) may store data in an auditable format. For example, when object level metadata associated with any number of data chunks indicates that an audit trail is to be generated, the storage manager (402) may store changes to data rather than modifying data when modifications to the data chunks are made. For example, the storage manager (402) may generate a new data chunk when a modification to a data chunk is made. The new data chunk may reflect the changes to the data chunk upon which the new data chunk is based. A time stamp (e.g., 418) for the new data chunk may also be stored to enable a trail of changes to data chunks over time to be recorded. Consequently, any number of data chunks associated with different points in time by corresponding time stamps (418) may be stored when modifications to a particular data chunk is made.

When providing its functionality, the storage manager (402) may generate, store, and/or utilize previously stored data integrity coded chunks (412), object level metadata (414), and/or chunk level metadata (416) in persistent storage.

To store data, the example storage (400) may include persistent storage (410). The persistent storage (410) may provide storage resources. To provide storage resources, the persistent storage (410) may include any number of physical devices for storing data. For example, the persistent storage (410) may include hard disk drives, solid state drives, tape drives, or any other type of physical storage devices that provides non-transitory storage resources. The persistent storage (410) may also include transitory storage resources such as, for example, memory for temporarily storing data until the data is able to be stored in non-transitory storage resources.

The persistent storage (410) may store data integrity coded chunks (412), object level metadata (414), chunk level metadata (416), and time stamps (418). Each of these data structures is discussed below.

The data integrity coded chunks (412) may be data structures that include information reflecting data (420), system metadata (422), and/or data integrity information (424), as illustrated in FIG. 4.2. The data integrity coded chunks (412) may include any number of data chunks. Each data chunk may correspond to a portion of data generated by a data integrity scheme such as, for example, erasure coding or other type of scheme. For example, any number of data chunks may be generated when an erasure coding algorithm is performed on any quantity of data. The quantity of data may include data (420) from a system (e.g., file system or other type of data organization scheme) and/or system metadata (422). When performing the algorithm, data integrity information (424) may be generated. The data integrity information (424) may be, for example, parity chunks that enable a portion of the chunks to be regenerated when the chunks are lost due to, for example, failure of a persistent storage.

In one or more embodiments of the invention, multiple versions of a particular data chunk are included in the data integrity coded chunks (412). As noted above, embodiments of the invention may provide a method for generating an audit trail. An audit trail may be a collection of copies of a particular data chunk over time. In other words, the audit trail may include any number of copies of the data chunk that are associated with different portions in time (e.g., after changes to the particular data chunk have been made). Each of the copies of the data chunk may include different information (and/or duplicative information included in other data chunks of the audit trail).

Returning to FIG. 4.1, the object level metadata (414) may be a data structure that includes metadata associated with any number of the data chunks of the data integrity coded chunks (412). For example, a portion of the object level metadata (414) may correspond to a number of the data chunks that include information regarding a particular object (e.g., a file). The portion of the object level metadata (414) may include, for example, an identifier of an object (e.g., a file name), characteristics of the object, identifiers of data chunks of the data integrity coded chunks (412) corresponding to the object, and other types of information associated with the object. The object level metadata (414) may include any number of portions that correspond to any number of objects associated with respective portions of the chunks of the data integrity coded chunks (412). For additional information regarding object level metadata (414), refer to FIG. 4.3.

The chunk level metadata (416) may be a data structure that includes metadata associated with corresponding chunks of the data integrity coded chunks (412). For example, a portion of the chunk level metadata (416) may correspond to a single data chunk of the data chunks of the data integrity coded chunks (412). The portion of the chunk level metadata (416) may include, for example, an identifier of the single data chunk, access information for the single data chunk (e.g., an identifier of a storage that stores the single chunk, an identifier of a computing resource aggregation that includes the storage, an identifier of a region that includes the computing resource aggregation, etc.), and/or classification information regarding the single data chunk. The classification information may include, for example, information regarding the single data chunk such as, for example, whether the single chunk includes information that may be restricted due to jurisdictional regulations (e.g., personal information), access restrictions with respect to the single data chunk, and/or other types of information regarding the single data chunk. The chunk level metadata (416) may include any number of portions that correspond to any number of data chunks. Each of the corresponding data chunks may be stored in the example storage (400) and/or in other storages.

The time stamps (418) may be data structures that specify different points in time that are associated with corresponding data integrity coded chunks (412). The time stamps (418) may specify points in time at which a particular data chunk was modified. The data integrity coded chunk corresponding to a time stamp may represent the state of the particular data chunk. Thus, the time stamps (418) and a portion of the data integrity coded chunks (412) may be used to track changes to a data chunk over time. In this manner, prior versions of data chunks may be accessed.

While the example storage (400) has been described as including a limited number of specific components, an example storage (400) in accordance with embodiments of the invention may include additional, fewer, and/or different components without departing from the invention. Further, while the data structures illustrated in FIGS. 4.1-4.2 have been described as being separate and including a limited amount of specific information, the aforementioned data structure may include additional, different, and/or less information, may be stored in other locations, may be distributed across any number of devices, and may be subdivided into any number of data structures stored in any number of locations without departing from the invention.

As discussed above, object level metadata may include information regarding an object, information used to manage the data chunks corresponding to the object, and/or other types of information. FIG. 4.3 shows a diagram of object level metadata (414) in accordance with one or more embodiments of the invention. The object level metadata (414) may include geolocation information (430), policy information (432), organization information (434), industry information (436), retention information (438), and/or data control restrictions (440). Each of these components of the object level metadata (414) is discussed below.

The geolocation information (430) may specify geographic information associated with one or more objects. For example, the geolocation information (430) may specify a geographic region in which an object resides (i.e., where the storages are located that store the data chunks associated with an object), governmental regulations on the object (e.g., if the object is subject to regulations such as the general data protection regulation), and/or other types of geographic information associated with the object.

The policy information (432) may specify information regarding data management policies associated with one or more objects. For example, the policy information (432) may specify where the object is to be stored (i.e., storages, regions, etc.) over time, a level of redundancy for storing of the object, and/or other types of information used to store the object.

The organization information (434) may specify information regarding an organization that has rights in one or more objects. For example, the organization information (434) may specify organizations that are the owners of one or more of the object, have access rights to one or more of the objects, or any other types of rights that organizations may have with respect to objects.

The industry information (436) may specify information regarding types of industries associated with owners of objects. For example, the industry information (436) may specify whether governmental regulations associated with different industries may restrict or otherwise require objects to be handled in a prescribed manner. For example, medical data may be subject to different types of compliance standards than customer sales records.

The retention information (438) may specify retention plans for one or more of the objects. The retention plans may specify when, how, and under what conditions the objects may be deleted. For example, a retention plan may specify that a particular object is to be retained in storage for one year and may be deleted after the one year period.

The data control restrictions (440) may specify how data chunks associated with respective objects are to be handled. For example, the data control restrictions (440) may specify whether data may be deleted, modified, or read. In another example, the data control restrictions (440) may specify whether an audit trail is to be maintained. In a still further example, the data control restrictions (440) may specify whether particular users are authorized to access, modify, and/or delete the data chunks associated with a respective object.

While the object level metadata (414) has been illustrated and described as including a limited amount of specific information, object level metadata (414) in accordance with embodiments of the invention may include additional, different, and/or less information without departing from the invention.

Returning to FIG. 1, the data storage system (104) may provide data management services for clients and/or other entities. FIGS. 5.1-5.7 illustrates methods that may be performed by the data storage system (104) of the system of FIG. 1 when providing data management services.

FIG. 5.1 shows a flowchart of a method in accordance with one or more embodiments of the invention. The method depicted in FIG. 5.1 may be used to service update requests in accordance with one or more embodiments of the invention. The method shown in FIG. 5.1 may be performed by, for example, a data storage system (e.g., 104, FIG. 1.1). Other components of the system illustrated in FIG. 1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, an update request is obtained. The update request may include a metadata characteristic and update data.

In one or more embodiments of the invention, the update request is obtained by a global enumerator. The update request may be obtained by receiving the request in a message from client or another type of entity. The update request may be obtained by a regional enumerator acting as a global enumerator without departing from the invention.

In one or more embodiments of the invention, the update request is a request for updating data and/or metadata stored by the data storage system. For example, the update request may be a request to modify all object level metadata in a region to indicate that an audit trail for data chunks associated with the object level metadata should be generated.

In one or more embodiments of the invention, the metadata characteristic specifies a characteristic of object level and/or chunk level metadata. The characteristic of the metadata may match one or more portions of the object level metadata and/or the chunk level metadata.

For example, the metadata characteristic may specify a computing resource aggregation of a region. In other words, the update request may be a request for modifying all metadata (e.g., object/chunk level metadata) and/or data associated with metadata that is stored in a particular computing resource aggregation.

In one or more embodiments of the invention, the metadata characteristic is multi-dimensional. In other words, the metadata characteristic specifies multiple characteristics. For example, the metadata characteristic may be for (i) all metadata stored in a particular computing resource aggregation and (ii) that is of a particular classification (e.g., data associated with a particular person).

In one or more embodiments of the invention, the update data specifies how the metadata and/or data associated with the metadata is to be updated (the data may be included in one or more data chunks). The update data may specify how the metadata and/or associated metadata should be upon update completion. For example, the update data may specify that all object level metadata in a region should include particular geolocation information. In another example, the update data may specify new contents for one or more data chunks.

In step 504, the metadata characteristic is matched to a portion of object level metadata and/or chunk level metadata to identify an implicated metadata portion.

In one or more embodiments of the invention, the metadata characteristic is matched by comparing the metadata characteristic to the chunk level metadata and/or the object level metadata. A match may be determined based on the comparison. The match portion may include any amount (e.g., none, a small amount, a large amount, etc.) of chunk level metadata and/or the object level metadata.

In one or more embodiments of the invention, the match is performed via the method illustrated in FIG. 5.2. The match may be performed via other methods without departing from the invention.

In step 506, the implicated metadata portion and/or data chunks associated with the implicated metadata portion are modified based on the update data.

In one or more embodiments of the invention, the implicated metadata portion is updated by adding the update data to the implicated metadata portion.

In one or more embodiments of the invention, the implicated metadata portion is updated by modifying a portion of the implicated metadata portion based on the update data. For example, the portion of the implicated metadata portion may be replaced by the update data. In another example, the portion of the implicated metadata portion may be deleted based on the update data.

In one or more embodiments of the invention, the data chunks associated with the implicated metadata portion is updated by adding the update data to the data chunks. For example, new data chunks may be added that have contents based on the update data.

In one or more embodiments of the invention, the data chunks associated with the implicated metadata portion is updated by modifying a portion of the contents of the data chunks. For example, the contents of the data chunks may be modified based on the update data. In another example, the contents of the data chunks and/or the data chunks may be deleted based on the update data.

The implicated metadata portion and/or the data chunks associated with the implicated metadata portion may be modified via the method illustrated in FIG. 5.4. The implicated metadata portion and/or the data chunks associated with the implicated metadata portion may be modified via other methods without departing from the invention.

The method may end following step 506.

As noted above, a method illustrated in FIG. 5.2 may be performed to match the metadata characteristic to a portion of metadata. FIG. 5.2 shows a flowchart of a method in accordance with one or more embodiments of the invention. The method depicted in FIG. 5.2 may be used to metadata characteristic to a portion of metadata in accordance with one or more embodiments of the invention. The method shown in FIG. 5.2 may be performed by, for example, a data storage system (e.g., 104, FIG. 1.1). Other components of the system illustrated in FIG. 1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, a portion of regions that each store at least a portion of the implicated metadata is identified.

In one or more embodiments of the invention, the portion of the regions is identified by matching a dimension of the metadata characteristic of step 500 of FIG. 5.1 to an identifier of a computing resource aggregation and/or region. For example, as discussed above, the metadata characteristic may specify storage locations and/or regions (e.g., when information regarding data from a particular location/region is desired). The portion of the regions may be identified by matching the identifiers specified by the metadata characteristic to corresponding regions of the portion of the regions. To do so, object level metadata may be searched to identify the matching regions.

In step 512, sub-requests for respective regions of the portion of the regions are generated based on the update request.

The sub-requests for the respective regions may be generated by limiting the number of dimensions of the metadata characteristic specified by the update request to metadata characteristics that are relevant for each of the respective regions. For example, if an update request specifies a metadata characteristic that indicates that only a computing resource aggregation in a single region is likely to include responsive data (e.g., by specifying that only the data/metadata in the computing resource aggregation is to be considered when formulating a response to the update request by including, for example, an identifier of the computing resource aggregation in the metadata characteristic), only a sub-request for the region that includes the computing resource aggregation may be generated.

In step 514, the sub-requests are distributed to regional enumerators in respective regions of the portion of the regions.

In one or more embodiments of the invention, the sub-requests are distributed by sending copies of the sub-requests to the regional enumerators via corresponding messages.

In step 516, responses to the sub-requests are aggregated. The responses may include, for example, an indication the sub-request has been completed. The aggregated responses may be used to generate a response to the update request.

The method may end following step 516.

The methods illustrated in FIGS. 5.1-5.2 may be performed, for example, by a global enumerator. In some embodiments of the invention, the methods performed in FIGS. 5.1-5.2 may be performed by an instance of a regional enumerator that is acting as both a regional enumerator and a global enumerator. By performing the methods illustrated in FIGS. 5.1-5.2, a system in accordance with embodiments of the invention may efficiently respond to update requests by utilizing object level metadata and/or chunk level metadata to generate responses to update requests rather than by crawling data or employing more computationally expensive methods of servicing update requests.

As discussed above, sub-requests may be serviced by regional enumerators. FIG. 5.3 shows a flowchart of a method in accordance with one or more embodiments of the invention. The method depicted in FIG. 5.3 may be used to service a sub-request in accordance with one or more embodiments of the invention. The method shown in FIG. 5.3 may be performed by, for example, a data storage system (e.g., 104, FIG. 1.1). Other components of the system illustrated in FIG. 1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 520, a sub-request is obtained.

In one or more embodiments of the invention, the sub-request is obtained from a global enumerator. The sub-request may specify one or more metadata characteristics and update data. The one or more metadata characteristics may correspond to, for example, information that is included in object level metadata and/or chunk level metadata. The update data may specify how data and/or metadata are to be modified when the sub-request is serviced.

In step 522, copies of the sub-request are distributed to a portion of the storages in a region. The portion of the storages may include data and/or metadata that are likely to be responsive to the sub-request.

To identify the portion of the storages, object level metadata and/or chunk level metadata may be matched to one or more of the metadata characteristics. Copies of the sub-request may be distributed to only the storages corresponding to the matched object level metadata and/or chunk level metadata. By doing so, only a subset of all of the storages in a region may receive sub-requests. Consequently, only storages that are likely to include responsive data and/or metadata may be encumbered with processing of the sub-requests.

For example, the regional enumerator of each region may have access to a cached (i.e., in memory data structure) version of object level metadata associated with data chunks in a region. The metadata characteristics may be matched to the object level metadata to determine whether any of the data chunks and/or metadata in each of the storages is likely to be responsive to a sub-request. Sub-requests may be distributed to each of the storages corresponding to the matched metadata.

In step 524, the responses to the copies of the sub-requests are aggregated. For example, each of the storages that receives a copy of the sub-request may generate a response that indicates whether the sub-request has been completed. The response may specify other types of information without departing from the invention. The responses may be provided to regional enumerators of the corresponding regions.

In one or more embodiments of the invention, the responses only include information that a requesting entity is authorized to access. For example, metadata associated with data may specify access control restrictions for corresponding data. The access control restrictions may, for example, specify locations of entity that are authorized to access the data and/or locations of entities that are not authorized to access the data. The responses may only include data for which the requesting entity is authorized to access. Consequently, even if a storage includes responsive data, the storages may not include information regarding the responsive data if the requesting entity is not authorized to obtain information regarding the responsive data. As will be discussed in greater detail below, the access control restrictions may be implemented granularly or at a macro level by utilizing object level metadata and/or chunk level metadata to implement the access control restrictions.

In step 526, the aggregated responses to the copies of the sub-request are provided in response to the sub-request. For example, the responses may be combined into a single response that includes the information included in each of the responses to the copies of the sub-request. The response may deduplicate information that is duplicative in the responses to the sub-request obtained from the storages.

The method may end following step 526.

The method illustrated in FIG. 5.3 may be performed by regional enumerators. When performing the methods illustrated din FIG. 5.3, the regional enumerators may distribute sub-requests to computing resource aggregations and/or directly to storages included in each of the computing resource aggregations. For example, storage managers of each of the computing resource aggregations may distribute sub-requests received from a regional enumerator.

For example, in a scenario in which three computing clusters are disposed in a region, a regional enumerator may distribute sub-requests to each of the computing clusters. In turn the computing clusters may distribute copies of the sub-requests to each of the storages (or storage managers) hosted by the sub-requests. Each of the storages (or storage managers) may independently process the sub-requests in accordance with their individual workloads. By doing so, a data storage system in accordance with embodiments of the invention may provide a distributed method of addressing data access requests across any number of regions. Processing of the sub-requests may be performed asynchronously and, consequently, may be efficiently processed by each of the regions separately from the other regions.

As discussed above, copies of sub-requests may be serviced by individual storages and/or storage controllers of each computing device aggregation. FIG. 5.4 shows a flowchart of a method in accordance with one or more embodiments of the invention. The method depicted in FIG. 5.4 may be used to service a copy of a sub-request in accordance with one or more embodiments of the invention. The method shown in FIG. 5.4 may be performed by, for example, a data storage system (e.g., 104, FIG. 1.1). Other components of the system illustrated in FIG. 1 may perform all, or a portion, of the method of FIG. 5.4 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

In step 530, a copy of a sub-request is obtained. The copy of the sub-request may be obtained from a regional enumerator. The copy of the sub-request may be obtained from a storage manager. The copy of the sub-request may be obtained from other entities without departing from the invention.

For example, a regional enumerator may send a copy of the sub-request to a storage when servicing a sub-request. The sub-request may be included in a message sent to the storage by the regional enumerator.

In step 532, a metadata characteristic specified by the copy of the sub-request is matched to a portion of object level metadata and/or chunk level metadata.

As discussed above, sub-requests (and copies thereof) may specify uni-dimensional or multi-dimensional metadata characteristic. Portions of the metadata characteristic may match different portions of the object level metadata and/or the chunk level metadata.

For example, the metadata characteristic may specify a type of an organization. Similarly, object level metadata may specify an organization type for objects stored in the storage. The type of the organization may be compared to various portions of the object level metadata associated with corresponding objects to determine whether the metadata characteristic matches one or more of the portions of the object level metadata. Any such portions of the object level metadata that specify the same organization type, as specified by the metadata characteristic, may be considered to be matches.

In Step 534, the matched metadata and/or data chunks associated with the matched metadata are modified based on the update data. The update data may specify changes to be made to the aforementioned data chunks and/or metadata. The data chunks and/or matched metadata may be modified based on the specified changes.

Modifying the matched metadata and/or associated data chunks may include modifying all, or a portion, of the contents of the metadata and/or modifying all, or a portion of the contents of the data chunks associated with the matched metadata.

For example, modifying the matched metadata may include replacing the matched metadata with data included in and/or specified by the update data. In another example, modifying the data chunks associated with the matched metadata may include replacing the data chunks with data included in and/or specified by the update data. The matched metadata and/or associated data chunks may be modified via other methods without departing from the invention.

In another example, modifying the matched metadata may include adding new information to the metadata. The new information may specify from which regions the data corresponding to the data may be accessed. In other words, restrictions on the regions from which the data may be accessed may be added to the metadata. By doing so, region level access control restrictions may be placed on data on a macro level (e.g., by adding the information to object metadata) or a micro level (e.g., by adding the information to chunk level metadata.

The method may end following step 534.

The method illustrated in FIG. 5.4 may be performed asynchronously by any number of storage managers and/or storages without departing from the invention. For example, different storages may perform the same method at different points in time, at different rates, and/or otherwise in different manners in accordance with computing resource limitations of each of the aforementioned storages.

As discussed above, when responding to update requests, a system in accordance with embodiments of the invention may utilize object level metadata and/or chunk level metadata to service the update requests without resorting to crawling of data or other computationally expensive methods of crawling data. To do so, the system may generate object level metadata and/or chunk level metadata while storing data in the system. FIG. 5.5 shows a flowchart of a method in accordance with one or more embodiments of the invention. The method depicted in FIG. 5.5 may be used to store data in a data storage system in accordance with one or more embodiments of the invention. The method shown in FIG. 5.5 may be performed by, for example, a data storage system (e.g., 104, FIG. 1.1). Other components of the system illustrated in FIG. 1 may perform all, or a portion, of the method of FIG. 5.5 without departing from the invention.

While FIG. 5.5 is illustrated as a series of steps, any of the steps may be omitted, performed in a different order, additional steps may be included, and/or any or all of the steps may be performed in a parallel and/or partially overlapping manner without departing from the invention.

In step 540, data is obtained for storage.

In one or more embodiments of the invention, the data is obtained from a client. The data may include any quantity and/or type of data. For example, the data may include data (e.g., an object) corresponding to an object and metadata used by a file system for organization purposes.

In one or more embodiments of the invention, the data may be provided to the data storage system by a client. For example, the data may be sent to the data storage system from the client via an operable connection between the data storage system and the client.

In step 542, an object of the data is data integrity coded to obtain data chunks corresponding to the object. The data chunks may be data integrity coded data.

For example, the data may be integrity coded by erasure coding the data. Other types of data integrity algorithms may be used to encode the data without departing from the invention.

In one or more embodiments of the invention, the object of the data is a logical portion of data. For example, the logical portion of the data may correspond to a portion specified by an organization framework (e.g., a file system) used by a client to store the object prior to providing the data to the data storage system for storage.

In step 544, object level metadata for the object is obtained. The object level metadata may include information regarding the object. For example, the object level metadata may be derived from system-level metadata associated with the object. The object level metadata may also include other information regarding the object beyond that of system-level metadata. For example, the object level metadata may include classification information, access restrictions, and/or other information that may be utilized to restrict and/or control access to the object. Such information may be obtained via any method without departing from the invention.

In step 546, chunk level metadata for each of the data chunks is obtained. The chunk level metadata may include information regarding a corresponding data chunk. The chunk level metadata may include information derived from system-level metadata associated with an object that includes the data of the data chunk. The chunk level metadata may also include, for example, classification information regarding jurisdictional data access regulations, personal information, data access restrictions, and/or any other type of information that may be useful to discriminate the data chunk from other data chunks.

When generating the object level metadata and/or chunk level metadata, any type of algorithm may be used to data mine the corresponding data for relevant information regarding the metadata that should be generated for each of the data chunks. For example, algorithms designed to detect the presence of personal information (or other types of information that may be subject to data access/control restrictions) or other information that indicates that special precautions must be taken to manage the data included in the data chunks and/or objects. The metadata (i.e., object level and/or chunk level) may include relevant information based on such analysis of the data.

In step 548, the data chunks, the object level metadata, and the chunk level metadata is stored. For example, the data chunks may be distributed across any number of storage devices in accordance with fault domain restrictions imposed by a data integrity algorithm used to encode the data to obtain the data chunks. The object level metadata and/or the chunk level metadata may be stored along with the data chunks and/or in other locations. For example, the metadata may be stored separately from the data to improve the searchability of the metadata.

Any number of copies of the data chunks and metadata may be stored in any number of locations without departing from the invention. For example, copies of the metadata may be stored in a regional-level (i.e., in a repository reflecting all metadata of a region), in a computing resources aggregation level, and/or at a storage level. In contrast, copies of the data chunks may only be stored at a storage level.

By doing so, the metadata may be stored in a highly searchable manner that facilitates computational efficient searching of the metadata at different levels of granularity while copies of the data chunks may be stored in a reliable level at a storage level.

The method may end following step 548.

Thus, via the method illustrated in FIG. 5.5, metadata may be generated and/or stored in a manner that facilitates efficient searching of the data chunks. Further, because the data chunks are stored in a form that includes data integrity information, the data included in the data chunks may not be stored in an easily searchable form via direct searching of the data included in the data chunks.

As discussed above, the object level metadata and/or chunk level metadata may impact the manner in which a data storage system managers the corresponding data. FIGS. 5.6-5.7 show flowcharts of methods that may be used to manage data in a data storage system. FIG. 5.6 shows a flowchart of a method in accordance with one or more embodiments of the invention. The method depicted in FIG. 5.6 may be used to service a data deletion request in accordance with one or more embodiments of the invention. The method shown in FIG. 5.6 may be performed by, for example, a data storage system (e.g., 104, FIG. 1.1). Other components of the system illustrated in FIG. 1 may perform all, or a portion, of the method of FIG. 5.6 without departing from the invention.

While FIG. 5.6 is illustrated as a series of steps, any of the steps may be omitted, performed in a different order, additional steps may be included, and/or any or all of the steps may be performed in a parallel and/or partially overlapping manner without departing from the invention.

In step 550, a data deletion request for data is obtained. The data deletion request may, for example, specify an identifier (e.g., an identifier of an object, a data chunk, etc.) associated with one or more data chunks stored in a data storage system. The deletion request may specify a metadata characteristic. The deletion request may be obtained from a client or other entity.

In step 552, object level metadata associated with the data is identified. The object level metadata may be identified by matching, as discussed with respect to FIGS. 5.1-5.3. The object level metadata may be associated with any number of data chunks.

In step 554, it is determined whether the object level metadata indicates that the data is to be retained. The object level metadata may indicate that the data is to be retained by including a particular flag or other type of data structure to indicate retention of the data.

If it is determined that the data is to be retained, the method may proceed to step 558. If it is determined that the data is not to be retained, the method may proceed to step 556.

In step 556, one or more data chunks associated with the identified object level metadata is deleted in response to the data deletion request. For example, any number of data chunks may be associated with the identified object level metadata by information included in the object level metadata. The data deletion request may indicate that all, or a portion, of the associated data chunks are to be deleted (e.g., all or a portion of the object associated with the identified object level metadata).

The method may end following step 556.

Returning to step 554, the method may proceed to step 558 following step 556 if it is determined that the object level metadata indicates that the data is to be retained.

In step 558, one or more data chunks associated with the identified object level metadata are retained in response to the data deletion request. In other words, the data chunk may not be deleted if the object level metadata indicates that the data is to be retained.

The method may end following Step 558.

FIG. 5.7 shows a flowchart of a method in accordance with one or more embodiments of the invention. The method depicted in FIG. 5.7 may be used to service a data deletion request in accordance with one or more embodiments of the invention. The method shown in FIG. 5.7 may be performed by, for example, a data storage system (e.g., 104, FIG. 1.1). Other components of the system illustrated in FIG. 1 may perform all, or a portion, of the method of FIG. 5.7 without departing from the invention.

While FIG. 5.7 is illustrated as a series of steps, any of the steps may be omitted, performed in a different order, additional steps may be included, and/or any or all of the steps may be performed in a parallel and/or partially overlapping manner without departing from the invention.

In step 560, a modification for a data chunk is obtained. The modification may indicate that the content of the data chunk (and/or other data chunks) is to be changed. The modification may be obtained from a client or another entity.

In Step 562, it is determined whether the data chunk is subject to an audit trail.

The determination may be made based on object level metadata and/or chunk level metadata associated with the data chunk. For example, object level metadata associated with the data chunk (and/or any number of other data chunks) may specify whether the data chunk is subject to an audit trail. Being subject to an audit trail may mean that changes to the data chunk are to be tracked and/or maintained.

If it is determined that the data chunk is subject to an audit trail, the method may proceed to step 566. If it is determined that the data chunk is not subject to an audit trail, the method may proceed to step 564.

In step 564, the data chunk is modified based on the modification. For example, the contents of the data chunk may be modified to match contents specified by the modification.

The method may end following step 564.

Returning to step 562, the method may proceed to 566 following step 562 if it is determined that the data chunk is subject to an audit trail.

In Step 566, a new data chunk is generated based on the modification.

The new data chunk may, for example, reflect the contents of the data chunk as modified based on the modification.

In one or more embodiments of the invention, a time stamp associated with the new data chunk may be generated. The time stamp may be stored as part of object level metadata and/or chunk level metadata associated with the data chunk and/or the new data chunk. By doing so, the state of the data chunk at different points in time may be tracked and stored for later use.

In some embodiments of the invention, the time stamp may indicate a time of generation of the new data chunk. In other embodiments of the invention, the time stamp may indicate a relative ordering of data chunks with respect to other data chunks.

When the new data chunk is generated, metadata associated with the data chunk (and any number of other data chunks associated with an audit trail) may be updated to reflect that the new data chunk is associated with the data chunk. For example, the object metadata for an object may be updated to indicate that the new data chunk is also associated with the object.

The method may end following step 566.

Thus, via the methods illustrated in FIGS. 5.6-5.7, a data storage system in accordance with embodiments of the invention may manage data based on object and/or chunk level metadata without restoring to crawling of data or other computationally expensive methods to make such management decisions.

To further clarify embodiments of the invention, a non-limiting example is provided in FIGS. 6.1-6.6. Each of these figures may illustrate a system similar to that of FIG. 1 at different points in times. For the sake of brevity, only a limited number of components of the system of FIG. 1 are illustrated in each of FIGS. 6.1-6.6.

Example

Consider a scenario as illustrated in FIG. 6.1 in which a data storage system (610) includes a storage (620) that stores object level metadata (622), a first data chunk (624), and a second data chunk (626). The object level metadata (622) indicates that the first data chunk (624) and the second data chunk (626) include data associated with an object to which the object level metadata (622) is associated.

At a first point in time, a client (600) sends an object data modification request (602) to the data storage system (610). The object data modification request (602) includes a change to a portion of the object which corresponds to data stored in the second data chunk (626).

In response to receiving the object data modification request (602), the data storage system (610) modifies the second data chunk and obtains a modified second data chunk (628) as illustrated in FIG. 6.2. However, because the modified second data chunk (628) is not subject to an audit trail, no records for the modification are maintained. Accordingly, in the state illustrated in FIG. 6.2, any entity that requests the object associated with the object level metadata (622) will be provided with a copy of the object that includes a modification due to the modified second data chunk (628).

At a second point in time illustrated in FIG. 6.3, the client (600) determines that it is in its interest to be able to determine whether changes have been made to the object. In response to the determination, the client (600) sends an audit trail generation request (604) to the data storage system (610). The audit trail request indicates that an audit trail for the object associated with the object level metadata (622) is to be maintained.

In response to receiving the request, the data storage system (610) modifies the object level metadata (622), as illustrated in FIG. 6.4, to include time stamps associated with the first object and the second object and to indicate that an audit trail is to be maintained for the object associated with the object level metadata.

At a third point in time, the client (600) determines that a portion of the object reflected in the first data chunk (624) is to be changed. In response to the determination, the client (600) seconds a second object data modification request (606) to the data storage system (610) as illustrated in FIG. 6.5. The second object data modification request (606) indicates that a portion of the object corresponding to the first data chunk (624) is to be modified.

In response to obtaining the second object data modification request (606), the data storage system (610) generates a new first data chunk (630) as illustrated in FIG. 6.6. The new first data chunk (630) includes the contents of the first data chunk (624) as modified by the second object data modification request (606). Additionally, the data storage system (610) may add a new first data chunk time stamp to the object level metadata (622).

In the state illustrate din FIG. 6.6, the data storage system (610) is capable of providing copies of the object associated with the object level metadata (622) at different points in time. The system may do so by generating copies of the object using different combinations of the first data chunk (624), the modified second data chunk (628), and the new first data chunk (630). Thus, the system of FIG. 6.6 may be capable of allowing a client to determine whether and to what extent data has been modified over time, and to recover copies of the data that reflect the state of the data at different points in time.

End of Example

Thus, via the method illustrated in FIGS. 6.1-6.7, embodiments of the invention may provide a method for maintaining an audit trail without utilizing system metadata.

Figure 7:
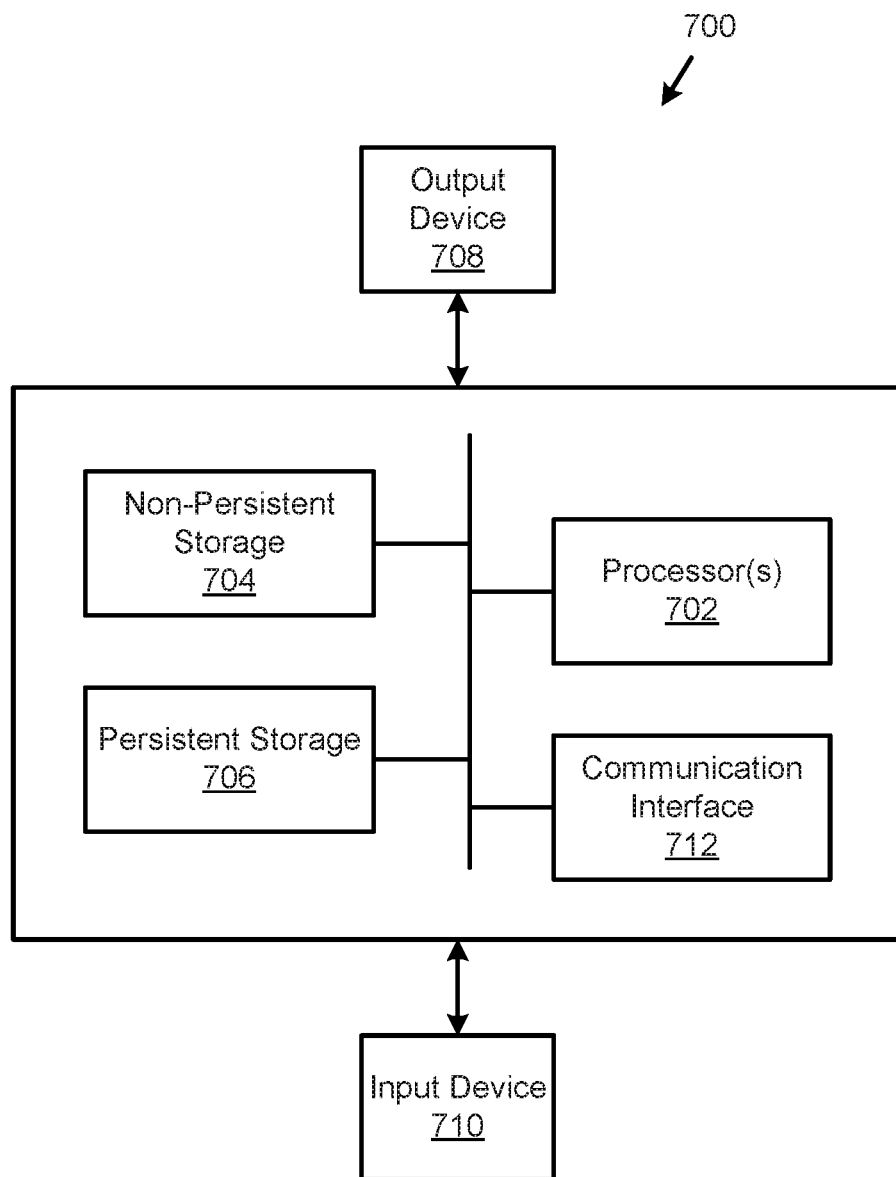
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a computationally efficient method for managing data in a data storage system. To do so, metadata (e.g., object/chunk level metadata) may be generated and maintained that specifies how the corresponding data is to be managed by the data storage system. Such metadata may be used to control and enforce when and how data is deleted or modified.

Thus, embodiments of the invention may address the problem of management of data in a distributed system. By utilizing metadata to control how data is managed, embodiments of the invention may improve the ability of a system to manage data.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device.

Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage system, comprising:
storage for storing: data chunks, object level metadata associated with portions of the data chunks, and chunk level metadata associated with respective data chunks; and
a global enumerator programmed to:
obtain an update request comprising a metadata characteristic and update data, wherein the update request comprises data control restrictions to be established;
in response to obtaining the update request:
match the metadata characteristic to at least one selected from a group consisting of a portion of the object level metadata and a portion of the chunk level metadata to identify an implicated metadata portion,
wherein, to match the metadata characteristic, the global enumerator is configured to:
identify a plurality of regions that each store at least a portion of the implicated metadata portion;
generate sub-requests for respective regions of the plurality of regions based on the update request;
distribute the sub-requests to regional enumerators in respective regions of the plurality of regions; and
aggregate responses to the sub-requests from the regional enumerators; and
modify, based on the update data, the implicated metadata portion in accordance with the data control restrictions,
wherein the implicated metadata portion comprises the portion of the object level metadata, wherein the update data comprises a classification for an object, a computing resource aggregation, and at least one data control restriction, wherein modifying, based on the update data, the implicated metadata portion comprises:
adding the classification and the at least one data control restriction to the portion of the object level metadata.

2. The data storage system of claim 1, wherein the classification specifies a geographic location associated with the object corresponding to the portion of the object level metadata.

3. The data storage system of claim 1, wherein the classification specifies a governmental restriction on the object corresponding to the portion of the object level metadata.

4. The data storage system of claim 1, wherein the classification specifies a retention policy for the object corresponding to the portion of the object level metadata.

5. The data storage system of claim 1, wherein the classification specifies an organization type that has rights in the object corresponding to the portion of the object level metadata.

6. The data storage system of claim 1, wherein the at least one data control restriction specifies users that are authorized to modify the object corresponding to the portion of the object level metadata.

7. The data storage system of claim 1, wherein the at least one data control restriction specifies that an audit trail is to be generated for the object corresponding to the portion of the object level metadata.

8. The data storage system of claim 7, wherein the global enumerator is further programmed to:
obtain a modification for a first data chunk of the data chunks;
make a determination, based on the updated portion of the object level metadata, that the first data chunk is subject to the audit trail;
in response to the determination, generate a new data chunk based on the modification.

9. The data storage system of claim 8, wherein the new data chunk is associated with a time stamp that specifies a time associated with when the new data chunk was generated.

10. The data storage system of claim 9, wherein the first data chunk is associated with a second time stamp that specifies a time prior to the time associated with when the new data chunk was generated.

11. The data storage system of claim 1, wherein the data chunks comprise:
client data; and
system metadata associated with the client data.

12. A method for managing a data storage system, comprising:
obtaining, by a global enumerator, an update request comprising a metadata characteristic and update data, wherein the update request comprises data control restrictions to be established;
in response to obtaining the update request:
matching, by the global enumerator, the metadata characteristic to at least one selected from a group consisting of a portion of object level metadata and a portion of chunk level metadata to identify an implicated metadata portion, wherein the object level metadata is associated with portions of data chunks and the chunk level metadata is associated with respective data chunks,
wherein matching the metadata characteristic comprises:
identifying a plurality of regions that each store at least a portion of the implicated metadata portion;
generating sub-requests for respective regions of the plurality of regions based on the update request;
distributing the sub-requests to regional enumerators in respective regions of the plurality of regions; and
aggregating responses to the sub-requests from the regional enumerators; and
modifying, based on the update data, the implicated metadata portion in accordance with the data control restrictions,
wherein the implicated metadata portion comprises the portion of the object level metadata, wherein the update data comprises a classification for an object, a computing resource aggregation, and at least one data control restriction, wherein modifying, based on the update data, the implicated metadata portion comprises:
adding the classification and the at least one data control restriction to the portion of the object level metadata.

13. The method of claim 12, wherein the classification specifies a geographic location associated with the object corresponding to the portion of the object level metadata.

14. The method of claim 12, wherein the classification specifies a governmental restriction on the object corresponding to the portion of the object level metadata.

15. A non-transitory computer readable medium comprising computer readable program code, which when executed by a computer processor enables the computer processor to perform a method for managing a data storage system, the method comprising:
- obtaining, by a global enumerator, an update request comprising a metadata characteristic and update data, wherein the update request comprises data control restrictions to be established;
- in response to obtaining the update request:
  - matching, by the global enumerator, the metadata characteristic to at least one selected from a group consisting of a portion of object level metadata and a portion of chunk level metadata to identify an implicated metadata portion, wherein the object level metadata is associated with portions of data chunks and the chunk level metadata is associated with respective data chunks,
  - wherein matching the metadata characteristic comprises:
    - identifying a plurality of regions that each store at least a portion of the implicated metadata portion;
    - generating sub-requests for respective regions of the plurality of regions based on the update request;
    - distributing the sub-requests to regional enumerators in respective regions of the plurality of regions; and
    - aggregating responses to the sub-requests from the regional enumerators; and
  - modifying, based on the update data, the implicated metadata portion in accordance with the data control restrictions,
  - wherein the implicated metadata portion comprises the portion of the object level metadata, wherein the update data comprises a classification for an object, a computing resource aggregation, and at least one data control restriction, wherein modifying, based on the update data, the implicated metadata portion comprises:
    - adding the classification and the data control restriction to the portion of the object level metadata.

16. The non-transitory computer readable medium of claim 15, wherein the classification specifies a geographic location associated with the object corresponding to the portion of the object level metadata.

* * * * *